United States Patent
Yeo et al.

(10) Patent No.: US 11,659,544 B2
(45) Date of Patent: May 23, 2023

(54) METHOD AND APPARATUS FOR TRANSMITTING AND RECEIVING SIDELINK SIGNAL IN WIRELESS CELLULAR COMMUNICATION SYSTEM

(71) Applicant: Samsung Electronics Co., Ltd., Suwon-si (KR)

(72) Inventors: Jeongho Yeo, Suwon-si (KR); Hyunseok Ryu, Suwon-si (KR); Sungjin Park, Suwon-si (KR); Jonghyun Bang, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/267,318

(22) PCT Filed: Aug. 9, 2019

(86) PCT No.: PCT/KR2019/010044
§ 371 (c)(1),
(2) Date: Feb. 9, 2021

(87) PCT Pub. No.: WO2020/032665
PCT Pub. Date: Feb. 13, 2020

(65) Prior Publication Data
US 2021/0345360 A1   Nov. 4, 2021

(30) Foreign Application Priority Data

Aug. 9, 2018   (KR) .................. 10-2018-0092926
Apr. 2, 2019   (KR) .................. 10-2019-0038551

(51) Int. Cl.
*H04W 72/12*   (2023.01)
*H04W 4/46*   (2018.01)
(Continued)

(52) U.S. Cl.
CPC ......... *H04W 72/1215* (2013.01); *H04W 4/46* (2018.02); *H04W 72/20* (2023.01); *H04W 72/543* (2023.01); *H04W 72/56* (2023.01)

(58) Field of Classification Search
None
See application file for complete search history.

(56) References Cited

U.S. PATENT DOCUMENTS 10,257,743 B2   4/2019   Yi et al.
2017/0245292 A1   8/2017   Agiwal et al.
(Continued)

FOREIGN PATENT DOCUMENTS

EP   3834550 A1   6/2021
KR   10-2018-0023034 A   3/2018
(Continued)

OTHER PUBLICATIONS

Ericsson, "Congestion Control in V2V", 3GPP Draft; R2-165516—Congestion Control for V2V, 3rd Generation Partnership Project (3GPP), Mobile Competence Centre ; 650, Route Des Lucioles ; F-06921 Sophia-Anti Polis Cedex ; France, vol. RAN WG2, no. Gothenburg, Sweden; Aug. 22, 2016-Aug. 26, 2016, Aug. 21, 2016, XP051126980.

(Continued)

*Primary Examiner* — Mohammad S Adhami
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health (Continued)

care, digital education, smart retail, security and safety services. The present disclosure relates to a transmission method of a terminal comprising: determining a simultaneous transmission of first and second communication-based sidelink signals; determining a priority of the first and second communication-based sidelink signals in case that the simultaneous transmission is configured; and processing the first and second communication-based sidelink signals on the basis of the priority.

16 Claims, 22 Drawing Sheets

(51) Int. Cl.
*H04W 72/20* (2023.01)
*H04W 72/56* (2023.01)
*H04W 72/543* (2023.01)

(56) References Cited

U.S. PATENT DOCUMENTS

| | | | |
|---|---|---|---|
| 2018/0139769 A1 | 5/2018 | Lee et al. | |
| 2018/0199251 A1 | 7/2018 | Kim et al. | |
| 2018/0234995 A1 | 8/2018 | Jung et al. | |
| 2019/0150135 A1 | 5/2019 | Lee et al. | |
| 2019/0281491 A1* | 9/2019 | Cheng | H04W 28/0252 |
| 2020/0053743 A1* | 2/2020 | Cheng | H04W 52/383 |
| 2020/0195414 A1* | 6/2020 | Nguyen | H04L 5/16 |
| 2021/0028910 A1* | 1/2021 | Cheng | H04L 5/0094 |
| 2022/0070879 A1* | 3/2022 | Ryu | H04W 72/0473 |

FOREIGN PATENT DOCUMENTS

| | | |
|---|---|---|
| KR | 10-2018-0079895 A | 7/2018 |
| KR | 10-2019-0127193 A | 11/2019 |
| WO | 2016/159728 A1 | 10/2016 |
| WO | 2016/175639 A1 | 11/2016 |
| WO | 2017/026844 A1 | 2/2017 |
| WO | 2017/192006 A2 | 11/2017 |
| WO | WO2020033628 * | 8/2018 |
| WO | 2020/029985 A1 | 2/2020 |

OTHER PUBLICATIONS

Extended European Search Report dated Aug. 18, 2021, issued in European Patent Application No. 19848124.4.
European Office Action dated Mar. 30, 2023, issued in European Application No. 19 848 124.4.

* cited by examiner

METHOD AND APPARATUS FOR TRANSMITTING AND RECEIVING SIDELINK SIGNAL IN WIRELESS CELLULAR COMMUNICATION SYSTEM

CROSS-REFERENCE TO RELATED APPLICATION(S)

This application is a U.S. National Stage under 35 U.S.C. § 371 of an International application number PCT/KR2019/010044, filed on Aug. 9, 2019, which is based on and claims priority to Korean Patent Application No. 10-2018-0092926, which was filed on Aug. 9, 2018 in the Korean Intellectual Property Office, and claims priority to Korean Patent Application No. 10-2019-0038551 which was filed on Apr. 2, 2019 the disclosure of which is incorporated by reference herein in its entirety.

TECHNICAL FIELD

The disclosure relates to a wireless communications system, and a method and apparatus for transmitting or receiving data in a sidelink. More specifically, the disclosure relates to a method for transmitting or receiving a signal prioritized by configurating priorities for transmission of the same type of long-term evolution (LTE) and new radio (NR) V2X signals when data is transmitted in the sidelink.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

A new radio (NR) access technology system, that is, a new 5G communication system, is designed so that various services are freely multiplexed in time and frequency resources, and accordingly, a waveform/numerology and a reference signal may be dynamically or freely allocated according to the necessity of the corresponding service. In order to provide an optimum service to a terminal in a wireless communication, it is important to transmit optimized data through measurement of the quality of a channel and the amount of interference, and thus it is essential to precisely measure a channel state. However, unlike 4G communication in which the channel and interference characteristics are not significantly changed according to the frequency resources, the channel and interference characteristics of a 5G channel are significantly changed according the services, and thus it is necessary to support a subset in the level of a frequency resource group (FRG) that allows division and measurement of the channel and interference characteristics. Meanwhile, in the NR system, the types of the supported services may be divided into categories, such as an enhanced mobile broadband (eMBB), massive machine type communications (mMTC), and ultra-reliable and low-latency communications (URLLC). The eMBB is a service for high-rate transmission of high-capacity data, and the mMTC is a service for minimization of terminal power and connection of a plurality of terminals, and the URLLC is a service for a high reliability and a low latency. Different requirements may be applied according to the types of the services applied to the terminal.

Along with the recent on-going research into next-generation communication systems, various schemes for scheduling communication with the terminal have been discussed. Accordingly, there is a need for an efficient scheduling and data transmission or reception scheme that considers characteristics of the next-generation communication systems.

As such, in a communication system, a plurality of services may be provided to a user, and a method for providing, to the user, each of the plurality of services in the same time period in accordance with the characteristics, and an apparatus using the method are required.

DISCLOSURE OF INVENTION

Technical Problem

A terminal which attempts to perform communication in a wireless system, specifically, in a sidelink for communication between terminals, may be a terminal having an LTE-based and an NR-based sidelink signal transmission or reception function. This may mean that LTE- and NR-based sidelink signal transmission or reception is simultaneously activated. In this case, the terminal needs to determine a reference by which the LTE-based sidelink signal and the NR-based sidelink signal are transmitted or received, in a particular time and frequency. For example, this may be performed based on the configuration from the base station, may be performed based on pre-promised priorities, or may be performed based on priorities of packets to be transmitted/received. Accordingly, an embodiment of the disclosure provides a method and apparatus for configuring a priority between LTE and NR and performing sidelink transmission or reception based on the priority, by a terminal having an LTE-based and an NR-based sidelink signal transmission or reception function.

Solution to Problem

An embodiment of the disclosure may provide a transmission method of a terminal, the method including: determining to perform simultaneous transmission of a first communication-based sidelink signal and a second communication-based sidelink signal; determining a priority of the first communication-based sidelink signal and the second communication-based sidelink signal in case that the simultaneous transmission is configured; and processing, based on the priority, the first communication-based sidelink signal and the second communication-based sidelink signal.

Further, an embodiment of the disclosure may provide a terminal including: a transceiver; and a controller which is connected to the transceiver, and performs control to: determine to perform simultaneous transmission of a first communication-based sidelink signal and a second communication-based sidelink signal; determine a priority of the first communication-based sidelink signal and the second communication-based sidelink signal in case that the simultaneous transmission is configured; and process, based on the priority, the first communication-based sidelink signal and the second communication-based sidelink signal.

Advantageous Effects of Invention

According to an embodiment of the disclosure, a sidelink transmission or reception method may be provided.

Further, according to an embodiment of the disclosure, a terminal having an LTE and an NR-based sidelink signal transmission or reception function may configure priorities, and determine a physical channel and a signal to be transmitted or received, thereby performing data transmission or reception according to the configuration and the determination.

MODE FOR THE INVENTION

Figure 1:
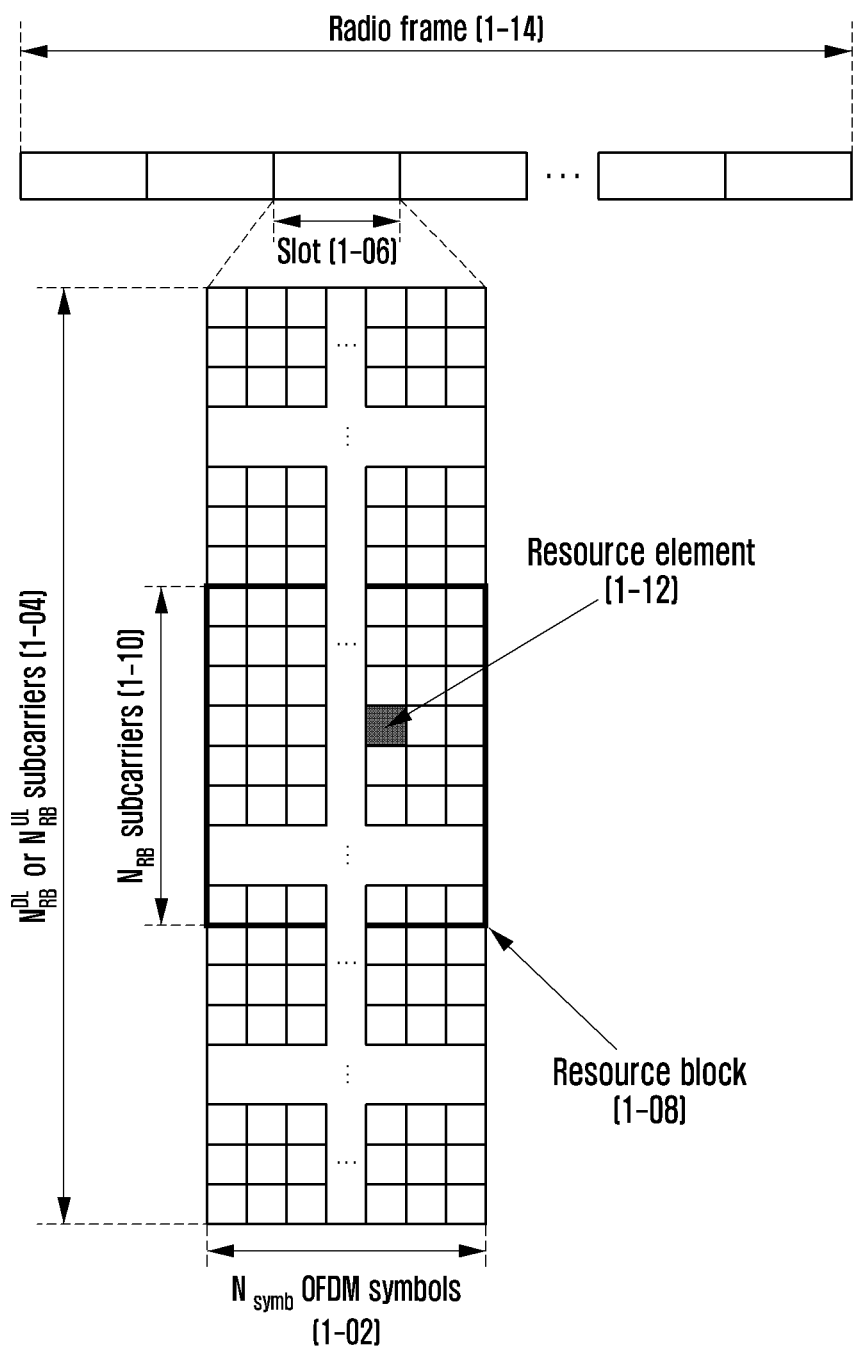
FIG. 1 illustrates a downlink or uplink time-frequency-domain transmission structure in an NR system according to an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Wireless communication systems have expanded beyond the original role of providing a voice-oriented service and have evolved into wideband wireless communication systems that provide a high-speed and high-quality packet data service according to, for example, communication standards such as high-speed packet access (HSPA), long-term evolution (LTE or evolved universal terrestrial radio access (E-UTRA)), and LTE-Advanced (LTE-A) of 3GPP, high-rate packet data (HRPD) and a ultra-mobile broadband (UMB) of 3GPP2, and 802.16e of IEEE. Furthermore, communication standards of 5G or new radio (NR) are being developed as 5th generation wireless communication systems.

As a representative example of the broadband wireless communication systems, in an NR system, an orthogonal frequency-division multiplexing (OFDM) scheme has been adopted for a downlink (DL) and an uplink (UL). More specifically, a cyclic-prefix OFDM (CP-OFDM) scheme has been adopted for the downlink, and two schemes of a CP-OFDM scheme and a discrete Fourier transform spreading (DFT-S-OFDM) scheme have been adopted for the uplink. The uplink indicates a radio link through which data or a control signal is transmitted from a terminal (a user equipment (UE), a mobile station (MS), or a terminal) to a base station (a gNode B (gNB) or a base station (BS)), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

The NR system adopts a hybrid automatic repeat request (HARQ) scheme of retransmitting corresponding data in a physical layer when a decoding failure occurs in initial transmission. According to the HARQ scheme, when a receiver fails to precisely decode data, the receiver transmits information (negative acknowledgement (NACK)) notifying a transmitter of the decode failure, to the transmitter so that the transmitter can retransmit the corresponding data in the physical layer. The receiver combines the data retransmitted by the transmitter with the data for which decoding has previously failed, thereby increasing data reception performance. Furthermore, when the receiver accurately decodes data, the receiver transmits information (acknowledgement (ACK)) notifying the transmitter of a decoding success, to the transmitter so that the transmitter can transmit new data.

Hereinafter, a base station is an entity that performs resource allocation to a terminal, and may be at least one of a gNode B (gNB), an eNode B (eNB), a Node B, a base station (BS), a radio access unit, a base station controller, or a node on a network. A terminal may include a user equipment (UE), a mobile station (MS), a cellular phone, a smartphone, a computer, or a multimedia system capable of performing a communication function. In the disclosure, a downlink (DL) means a radio transmission path of a signal transmitted from a base station to a terminal, and an uplink (UL) means a radio transmission path of a signal transmitted from a terminal to a base station. Furthermore, the NR system is described as an example in the following embodiments of the disclosure, but an embodiment of the disclosure may be applied to other communication systems having a similar technical background or channel type. Furthermore, an embodiment of the disclosure may be applied to other communication systems through some modification without greatly departing from the range of the disclosure based on a determination of those having skilled technical knowledge.

In the disclosure, terms "physical" and "signal" in a conventional sense may be interchangeably used with "data" or a "control signal". For example, a PDSCH is a physical channel through which data is transmitted, but in the disclosure, the PDSCH may be used to refer to data.

Hereinafter, in the disclosure, higher layer signaling is a method of transferring a signal from a base station to a terminal by using a downlink data channel in a physical layer or transferring a signal from a terminal to a base station by using an uplink data channel in a physical layer, and may be referred to as radio resource control (RRC) signaling or a medium access control control element (MAC CE).

FIG. 1 illustrates a basic structure of a time-frequency domain that is a wireless resource area in which data or a control channel is transmitted in a downlink or an uplink in an NR system according to an embodiment of the disclosure.

In FIG. 1, a horizontal axis represents a time domain and a vertical axis represents a frequency domain. The minimum transmission unit in the time domain is an OFDM symbol, and $N_{symb}$ OFDM symbols 1-02 constitute one slot 1-06. The length of a subframe is defined as 1.0 ms, and the length of a radio frame 1-14 is defined as 10 ms. A minimum transmission unit in the frequency domain is a subcarrier, and the bandwidth of the entire system transmission bandwidth includes a total of $N_{BW}$ subcarriers 1-04.

In the time-frequency domain, a basic unit of a resource is a resource element (RE) 1-12 and may be indicated as an OFDM symbol index and a subcarrier index. A resource block (RB or a physical resource block (PRB)) 1-08 may be defined as $N_{symb}$ consecutive OFDM symbols 1-02 in the time domain, and $N_{RB}$ consecutive subcarriers 1-10 in the frequency domain. Accordingly, $N_{symb} \times N_{RB}$ REs constitute one RB 1-08. In general, a minimum transmission unit of data is the RB unit. In the NR system, in general, $N_{symb}=14$, $N_{RB}=12$, and $N_{BW}$ and $N_{RB}$ may be proportional to the band width of a system transmission bandwidth. A data rate may increase in proportion to the number of RBs scheduled in a terminal. In the NR system, in the case of a frequency division duplex (FDD) system in which the downlink and the uplink are divided and operated by frequency, a downlink transmission bandwidth and an uplink transmission bandwidth may be different. A channel bandwidth indicates a radio frequency (RF) bandwidth corresponding to a system transmission bandwidth. Table 1-01 and 1-02 show a part of a correspondence relation between system transmission bandwidths, subcarrier spacings, and channel bandwidths defined in an NR system having a frequency band under 6 GHz and a frequency band over 6 GHz. For example, in an NR system having a 30 kHz subcarrier spacing and a 100 MHz channel bandwidth, a transmission bandwidth includes 273 RBs. In the tables below, "N/A" indicates a combination of a bandwidth and a subcarrier, not supported in the NR system.

TABLE 1-01

| | | Channel bandwidth $BW_{Channel}$ [MHz] | | | | | |
|---|---|---|---|---|---|---|---|
| | Subcarrier spacing | 5 | 10 | 20 | 50 | 80 | 100 |
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 1-02

| | | Channel bandwidth BWChannel [MHz] | | | |
|---|---|---|---|---|---|
| | Subcarrier spacing | 50 | 10 | 20 | 50 |
| Transmission bandwidth configuration NRB | 60 kHz | | 66 | 132 | 264 | N/S |
| | 120 kHz | | 32 | 66 | 132 | 264 |

In the NR system, scheduling information on downlink data or uplink data is transferred from a base station to a terminal through downlink control information (DCI). The DCI is defined according to various formats, and may indicate, according to each format, whether the information is scheduling information (uplink grant (UL grant)) on uplink data or scheduling information (downlink grant (DL grant)) on downlink data, whether the information is compact DCI, the control information size of which is small, whether spatial multiplexing using multiple antennas is applied, whether the information is DCI for power control, etc. For example, DCI format 1-1, which is scheduling control information (DL grant) on downlink data, may include at least one of the following pieces of control information.

Carrier indicator: This indicates the frequency carrier on which data is transmitted.

DCI format indicator: This is an indicator for indicating whether the DCI is for a downlink or an uplink.

Bandwidth part (BWP) indicator: This indicates a BWP in which transmission is performed.

Frequency-domain resource assignment: This indicates an RB of a frequency domain, which is assigned for data transmission. A resource to be expressed is determined according to a system bandwidth and a resource assignment scheme.

Time-domain resource assignment: This indicates a slot and an OFDM symbol of the slot, in which a data-related channel is to be transmitted.

VRB-to-PRB mapping: This indicates a mapping scheme by which a virtual RB (VRB) index is mapped to a physical RB (PRB) index.

Modulation and coding scheme (MCS): This indicates a modulation scheme and a coding rate used for data transmission. That is, this may indicate information relating to whether the modulation scheme is QPSK, 16

QAM, 64 QAM, or 256 QAM, and may indicate a coding rate value indicating TBS and channel coding information.

Code-block group (CBG) transmission information: This indicates information on a CBG to be transmitted when CBG retransmission is configured.

HARQ process number: This indicates a process number of HARQ.

New data indicator: This indicates whether HARQ transmission is initial transmission or retransmission.

Redundancy version: This indicates the redundancy version of HARQ.

Transmission power control (TPC) command for physical uplink control channel (PUCCH): This indicates a TPC command for the PUCCH serving as an uplink control channel.

In the case of physical uplink shared channel (PUSCH) transmission above, information on time-domain resource assignment may be transferred via information on a slot in which a PUSCH is transmitted, a start symbol position S in the corresponding slot, and the number L of symbols to which the PUSCH is mapped. In the above, S may be a relative position from the start of a slot, L may be the number of consecutive symbols, and S and L may be determined based on a start and length indicator value (SLIV) defined as follows.

if (L−1)≤then $$SLIV=14 \cdot (L-1)+S$$

else $$SLIV=14 \cdot (14-L+1)+(14-1-S)$$

where 0<L≤14−S

Generally, the NR system may receive, through radio resource control (RRC) configuration, configuration of a table in which an SLIV value, a PUSCH mapping type, and information on a slot in which a PUSCH is transmitted are included in one row. Later, in the time domain resource assignment of the DCI, by indicating an index value in the table configured as above, a base station may transmit, to a terminal, the SLIV value, the PUSCH mapping type, and information on the slot in which the PUSCH is transmitted.

In the NR system, the PUSCH mapping type is defined as type A and type B. In the PUSCH mapping type A, the first symbol among demodulation reference signal (DMRS) symbols is located in the second or the third OFDM symbol in a slot. In the PUSCH mapping type B, the first symbol among DMRS symbols is located in the first OFDM symbol in a time domain resource assigned via PUSCH transmission.

The DCI may be subjected to a channel coding and modulation process, and may then be transmitted through a physical downlink control channel (PDCCH) (or "control information", hereinafter used interchangeably), which is a downlink physical control channel.

Generally, the DCI is scrambled with a specific radio network temporary identifier (RNTI) (or a terminal identifier), independently from each terminal, a cyclic redundancy check (CRC) is added thereto, and channel coding is performed, whereby each independent PDCCH is configured and transmitted. The PDCCH is mapped and transmitted in a control resource set (CORESET) configured for the terminal.

The downlink data may be transmitted through a physical downlink shared channel (PDSCH) serving as a physical channel for downlink data transmission. The PDSCH may be transmitted after the control channel transmission interval, and scheduling information such as a specific mapping position and modulation scheme in the frequency domain is determined based on DCI transmitted through the PDCCH.

Via an MCS in the control information included in the DCI, a base station may report, to a terminal, the modulation scheme applied to a PDSCH to be transmitted, and the size (transport block size (TBS)) of data to be transmitted. In an embodiment, the MCS may be configured of 5 bits or more or fewer bits. The TBS corresponds to a size before channel coding for error correction is applied to data (transport block, TB) to be transmitted by a base station.

In the disclosure, a transport block (TB) may include a medium access control (MAC) header, a MAC control element (CE), one or more MAC service data units (SDUs), and padding bits. Alternatively, the TB may indicate the unit of data, which allows a drop from a MAC layer to a physical layer, or a MAC protocol data unit (MAP PDU).

The modulation scheme supported by the NR system are quadrature phase shift keying (QPSK), 16 quadrature amplitude modulation (16 QAM), 64 QAM, and 256 QAM, and modulation orders (Qm) of the QPSK, 16 QAM, 64 QAM, and 256 QAM correspond to 2, 4, 6, and 8, respectively. That is, 2 bits for each symbol in the case of QPSK modulation, 4 bits for each symbol in the case of 16 QAM modulation, 6 bits for each symbol in the case of 64 QAM modulation, and 8 bits for each symbol in the case of 256 QAM modulation may be transmitted.

Figure 2:
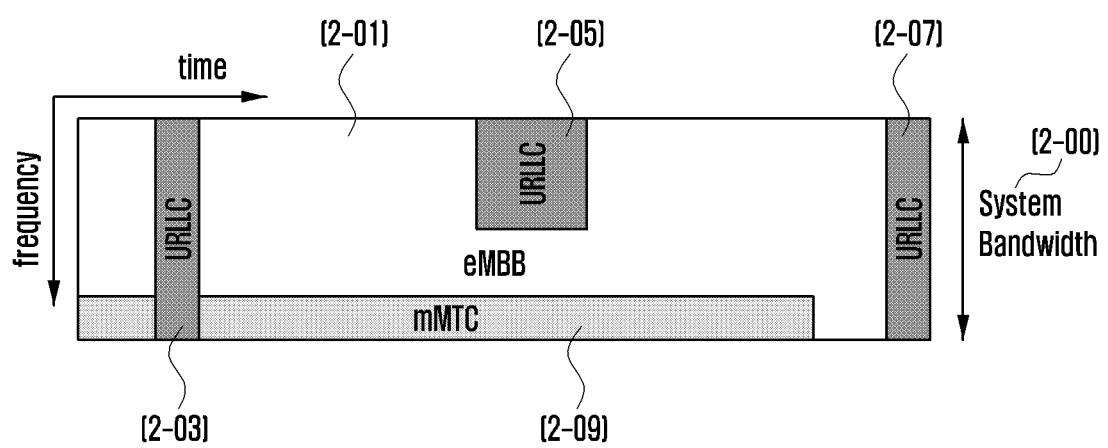
FIG. 2 illustrates allocation of pieces of data for enhanced mobile broadband (eMBB), ultra-reliable and low-latency communications (URLLC), and massive machine type communications (mMTC) in frequency-time resources in a communication system according to an embodiment of the disclosure.
Figure 3:
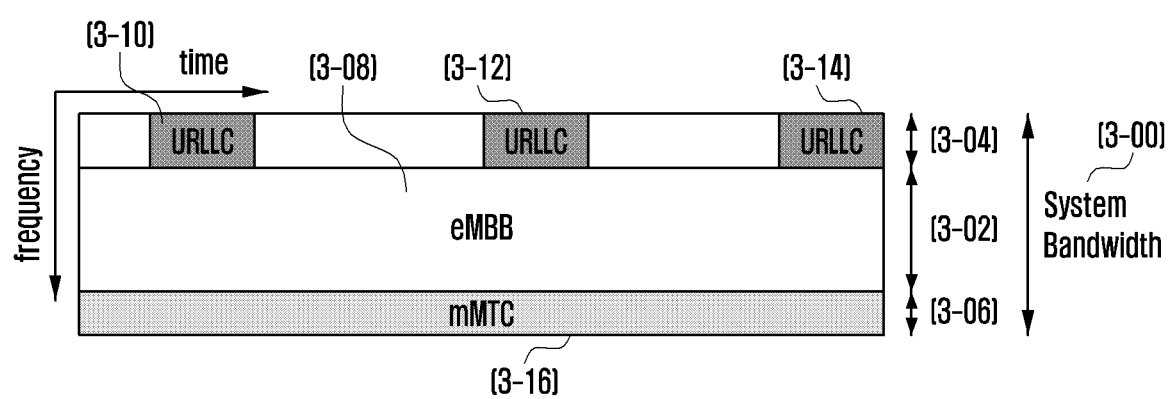
FIG. 3 illustrates a configuration in which pieces of data for eMBB, URLLC, and mMTC are allocated in frequency-time resources in a communication system according to an embodiment of the disclosure.

FIGS. 2 and 3 illustrate allocation of pieces of data for eMBB, URLLC, and mMTC, which are services considered in the 5G or NR system, in frequency-time resources according to an embodiment of the disclosure.

Referring to FIGS. 2 and 3, there may be presented a scheme in which frequency and time resources are allocated for performing information transmission in each system.

First, FIG. 2 illustrates allocation of pieces of data for eMBB, URLLC, and mMTC in the entire system frequency bandwidth 2-00. During allocation and transmission of eMBB 2-01 and mMTC 2-09 in a specific frequency bandwidth, when URLLC data 2-03, 2-05, and 2-07 is generated and transmission thereof is thus necessary, the URLLC data 2-03, 2-05, and 2-07 may be transmitted by emptying the portion in which the eMBB 2-01 and the mMTC 2-09 have been already allocated, or without transmitting the same. Since the URLLC needs to reduce a delay time during the service, URLLC data 2-03, 2-05, and 2-07 may be allocated to a portion of the resource 2-01 to which the eMBB is allocated, and thus may be transmitted. Of course, in the case where URLLC is additionally allocated and transmitted in the resource to which the eMBB is allocated, eMBB data may not be transmitted in an overlapping frequency-time resource, and accordingly, the transmission performance of the eMBB data may be lowered. That is, in the above case, eMBB data transmission failure due to URLLC allocation may occur.

In FIG. 3, the entire system frequency bandwidth 3-00 may be divided into sub-bands 3-02, 3-04, and 3-06 and used for transmission of a service and data therein. Information associated with the sub-band configuration may be predetermined, and the information may be transmitted to a terminal by a base station via higher layer signaling. Alternatively, the information associated with the sub-bands may be divided by a base station or a network node in a predetermined manner, and thus services are provided to the terminal without transmission of separate sub-band configuration information. FIG. 3 illustrates that the sub-band 3-02 is used for eMBB data transmission, the sub-band 3-04 is used for URLLC data transmission, and the sub-band 3-06 is used for mMTC data transmission.

Throughout the embodiment, the length of a transmission time interval (TTI) used for URLLC transmission may be shorter than the length of TTI used for eMBB or mMTC transmission. In addition, the response of information related to the URLLC may be transmitted faster than that of eMBB or mMTC, and accordingly, information transmission or reception with a low delay is possible. The structures of physical layer channels used for each type for transmission of the three types of services or data may be different from each other. For example, at least one of the length of a transmission time interval (TTI), an allocation unit of frequency resources, a structure of a control channel, and a data mapping scheme may be different.

In the above description, three types of services and three types of data are described, but an even greater number of types of services and data corresponding thereto may exist, in which case the contents of the disclosure may be applied.

In order to describe a method and apparatus proposed in the embodiment, the terms "physical channel" and "signal" in the NR system may be used. However, details of the embodiment may be applied to a wireless communication system rather than the NR system.

Figure 4:
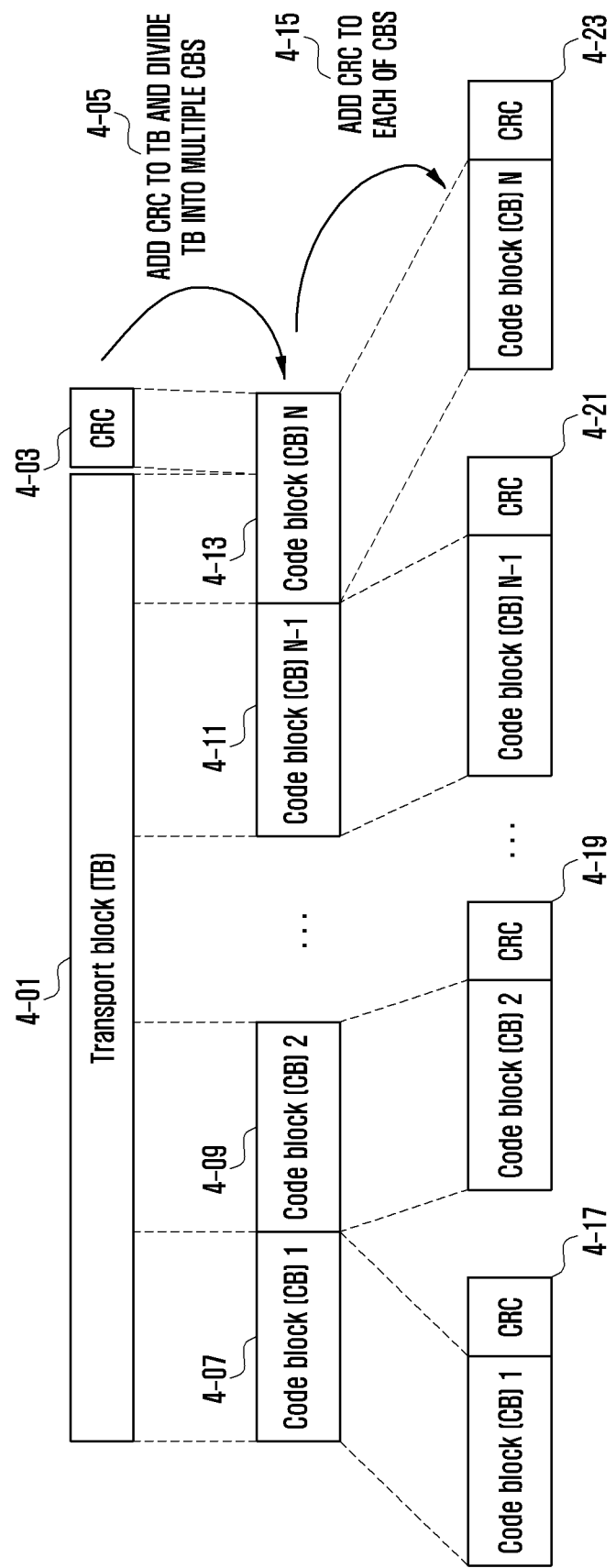
FIG. 4 illustrates a structure in which one transport block is divided into several code blocks and a cyclic redundancy check (CRC) is added thereto according to an embodiment of the disclosure.

FIG. 4 illustrates a process in which one transport block is divided into several code blocks and a CRC is added thereto according to an embodiment of the disclosure.

Referring to FIG. 4, a CRC 4-03 may be added to the end or the beginning of one transport block (TB) 4-01 to be transmitted in an uplink or a downlink. The CRC 4-03 may have 16 bits, 24 bits, or a fixed number of bits, or may have a variable number of bits depending on channel conditions, and may be used to determine whether channel coding is successful. A block in which the CRC 4-03 is added to the TB 4-01 may be divided into several code blocks (CBs) 4-07, 4-09, 4-11, and 4-13 (indicated by reference numeral 4-05). The divided code blocks 4-07, 4-09, 4-11, and 4-13 may have a predetermined maximum size, in which case the last code block 4-13 may be smaller in size than those of the other code blocks, or may have a length adjusted to be the same as that of the other code blocks by adding 0, random values, or 1 into the same. CRCs 4-17, 4-19, 4-21, and 4-23 may be added to the divided code blocks, respectively (indicated by reference numeral 4-15). The CRC 4-17, 4-19, 4-21, and 4-23 may have 16 bits, 24 bits, or a fixed number of bits, and may be used to determine whether channel coding is successful.

The TB 4-01 and cyclic generator polynomial may be used for generating the CRC 4-03, and the cyclic generator polynomial may be defined in various manners. For example, assuming that the cyclic generator polynomial is $g_{CRC24A}(D)=D^{24}+D^{23}+D^{18}+D^{17}+D^{14}+D^{11}+D^{10}+D^7+D^6+D^5+D^4+D^3+D+1$ for a 24-bit CRC, if L=24, with respect to the TB data $a_0, a_1, a_2, a_3, \ldots, a_{A-1}, p_0, p_1, p_2, p_3, \ldots, p_{L-1}$ of CRC $p_0, p_1, p_2, p_3, \ldots, p_{L-1}$ may be determined as a value obtained by dividing $a_0 D^{A+23}+a_1 D^{A+22}+ \ldots +a_{A-1}D^{24}+p_0 D^{23}+p_1 D^{22}+ \ldots +p_{22}D^1+p_{23}$ by $g_{CRC24A}(D)$ with the remainder 0. Although the description has been made to the case where the CRC length L is 24, L may be determined to be various lengths such as 12, 16, 24, 32, 40, 48, or 64. After the CRC is added to the TB in the process as described above, the TB may be divided into N CBs 4-07, 4-09, 4-11, and 4-13. CRCs 4-17, 4-19, 4-21, and 4-23 are added to the divided CBs 4-07, 4-09, 4-11, and 4-13, respectively (indicated by reference numeral 4-15). Each of the CRCs 4-17, 4-19, 4-21, and 4-23 added to each of the CBs 4-07, 4-09, 4-11, and 4-13 may have a length that is different from the length of the CRC added to the TB, or another cyclic generator polynomial may be used. However, the CRC 4-03 added to the TB and CRCs 4-17, 4-19, 4-21, and 4-23 added to the code blocks may be omitted depending on the type of channel code to be applied to the code block. For example, in the case where a low-density parity check (LDPC) code, rather than a turbo code, is applied to the code block, the CRCs 4-17, 4-19, 4-21, and 4-23 to be inserted into the respective code blocks may be omitted. However, even in case that the LDPC is applied, the CRCs 4-17, 4-19, 4-21, and 4-23 may be added to the code blocks without any change. Further, even in case where a polar code is used, the CRCs may be added or omitted.

As described above with reference to FIG. 4, in the TB to be transmitted, the maximum length of one code block may be determined in accordance with the type of the applied channel coding, and division, into the code blocks, of the TB and the CRC added to the TB may be performed in accordance with the maximum length of the code blocks. In the conventional LTE system, a CRC for a CB is added to the divided CB, and data bits of the CB and the CRC are encoded into a channel code to determine coded bits, and the number of the rate-matched bits may be determined as pre-promised with respect to the respective coded bits.

Figure 5:
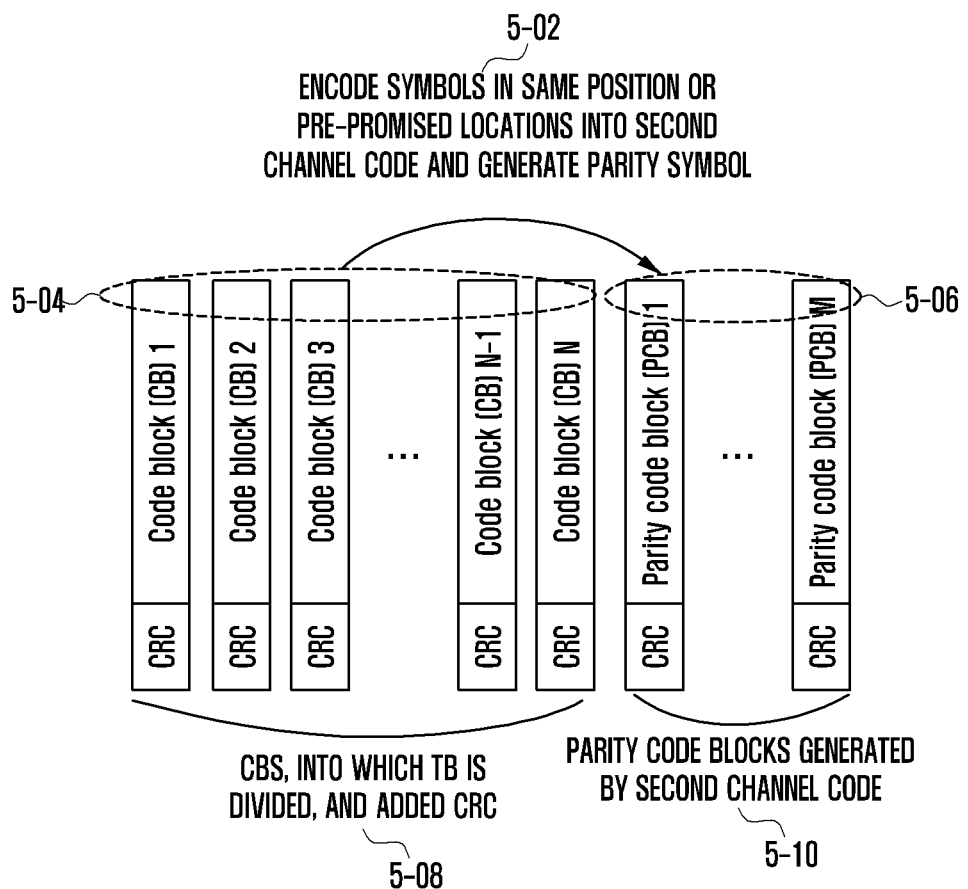
FIG. 5 illustrates structure in which an outer code is applied and coded according to an embodiment of the disclosure.
Figure 6:
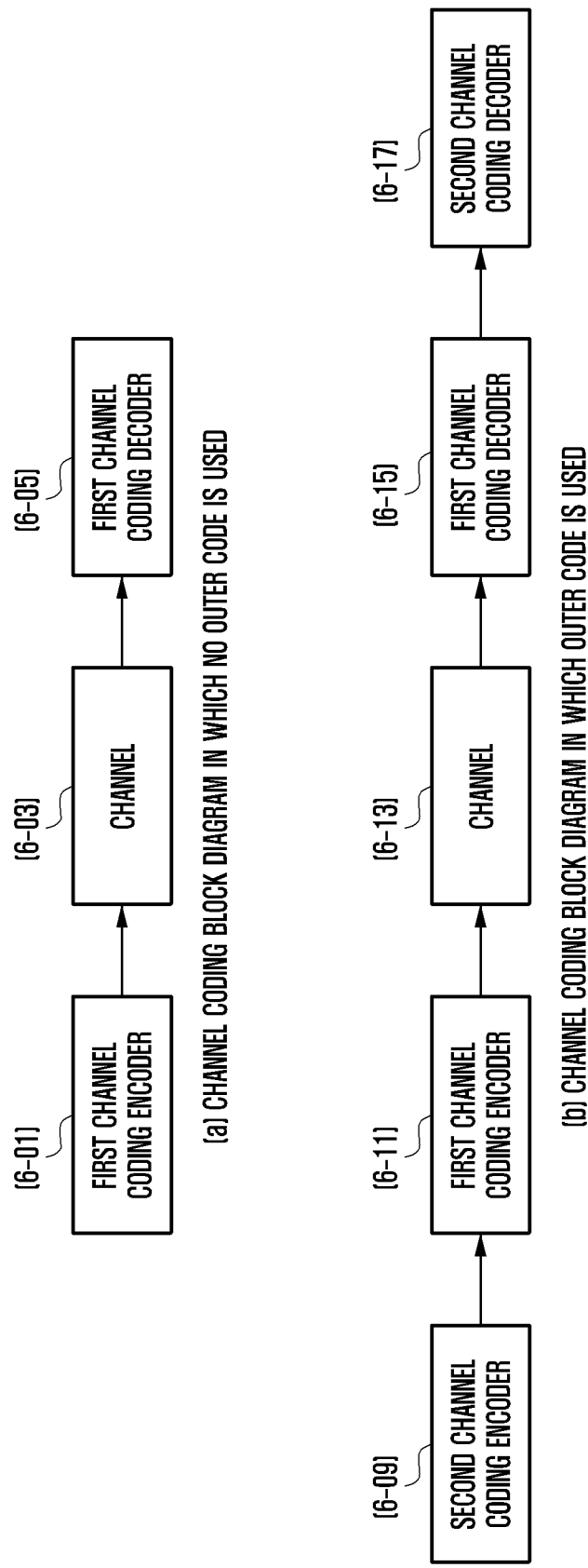
FIG. 6 is a block diagram according to whether or not an outer code is applied according to an embodiment of the disclosure.

FIG. 5 illustrates a transmission scheme using an outer code according to an embodiment of the disclosure, and FIG. 6 is a block diagram illustrating a structure of a communications system in which the outer code is used.

Referring to FIGS. 5, 6A, and 6B, a signal transmission scheme using an outer code is described.

In FIG. 5, a transport block is divided into multiple code blocks, and then bits or symbols 5-04 located at the same position in each of the multiple code blocks are encoded into a second channel code to generate parity bits or symbols 5-06 (indicated by reference numeral 5-02). Later, CRCs may be added to the code blocks and parity code blocks generated by the second channel code encoding, respectively (indicated by reference numerals 5-08 and 5-10). Whether to add the CRC may be determined depending on the type of the channel code. For example, when a turbo code is used as a first channel code, the CRCs 5-08 and 5-10 are added, but later the code blocks and parity code blocks may be encoded into the first channel code. In the disclosure, examples of the first channel code may include a convolutional code, an LDPC code, a turbo code, and a polar code. However, it is not limited thereto and the disclosure may be applied by using other various channel codes. In the disclosure, the second channel code may include, for example, a Reed-Solomon code, a BCH code, a raptor code, and a parity bit generation code. However, it is not limited thereto and the disclosure may be applied by using various other channel codes as the second channel code.

In the case of using an outer code as shown in FIG. 6B, data to be transmitted passes through a second channel coding encoder 6-09. The bits or symbols that have passed through the second channel coding encoder 6-09 pass through a first channel coding encoder 6-11. When the channel-coded symbols are received by a receiver by passing through a channel 6-13, the receiver may sequentially operate a first channel coding decoder 6-15 and a second channel coding decoder 6-17 by using the received signals. The first channel coding decoder 6-15 and the second channel coding decoder 6-17 may perform operations corresponding to the first channel coding encoder 6-11 and the second channel coding encoder 6-09, respectively.

On the other hand, in a channel coding block diagram of not using an outer code as shown in FIG. 6A, only a first channel coding encoder 6-01 and a first channel coding decoder 6-05 are used by the transceiver, and a second channel coding encoder and a second channel coding decoder are not used. Even in the case of not using the outer code, the first channel coding encoder 6-01 and the first channel coding decoder 6-05 may be configured the same as those for the case of using the outer coder.

Figure 7:
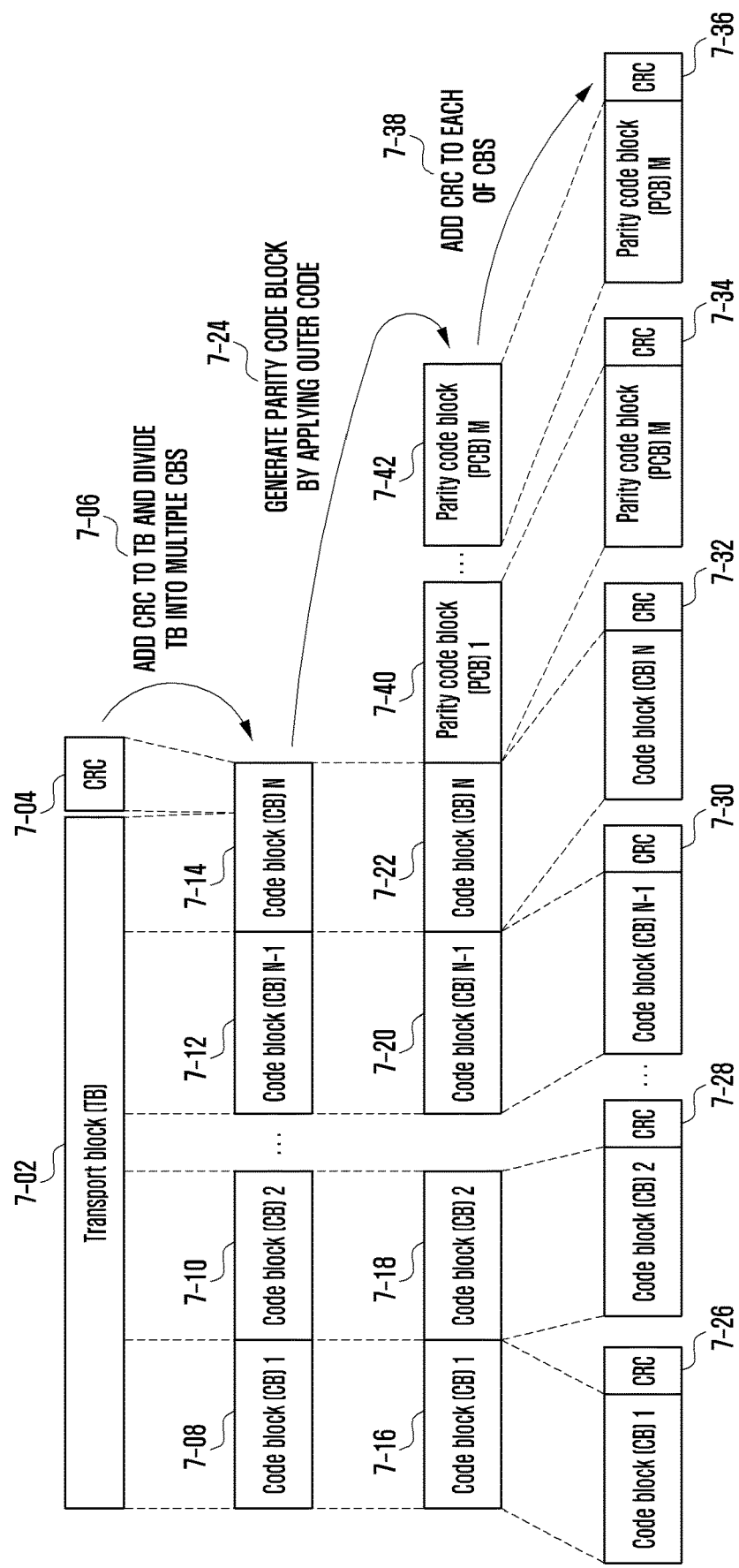
FIG. 7 illustrates a structure in which one transport block is divided into multiple code blocks, and an outer code is applied thereto, so as to generate a parity code block according to an embodiment of the disclosure.

FIG. 7 illustrates an example in which one transport block is divided into multiple code blocks and then a second channel code or an outer code is applied thereto, so as to generate one or more parity code blocks according to an embodiment of the disclosure. As described in FIG. 4 above, one transport block 7-02 is divided into one or more code blocks 7-08, 7-10, 7-12, and 7-14. When only one code block is generated according to the size of the transport block, CRC may not be added to the corresponding code block. When an outer code is applied to the code blocks to be transmitted, parity code blocks 7-40 and 7-42 are generated (indicated by reference numeral 7-24). When the outer code is used, the parity code blocks 7-40 and 7-42 are located subsequent to the last code block 7-22 (indicated by reference numeral 7-24). Subsequent to the outer code, CRCs 7-26, 7-28, 7-30, 7-32, 7-34, and 7-36 are added to code blocks 7-16, 7-18, 7-20, 7-22 and parity code blocks 7-40, and 7-42, respectively (indicated by reference numeral 7-38). Later, each of the code blocks and the parity code blocks may be encoded into a channel code together with the CRC.

Hereinafter, an embodiment provides a method and apparatus for transmitting or receiving data between a base station and a terminal, or between terminals, by applying an outer code. In this case, data may be transmitted from a single terminal to multiple terminals, or from a single terminal to another single terminal. Alternatively, data may be transmitted from a base station to multiple terminals. However, it is not limited thereto and the disclosure may be applied to other various cases.

Figure 8:
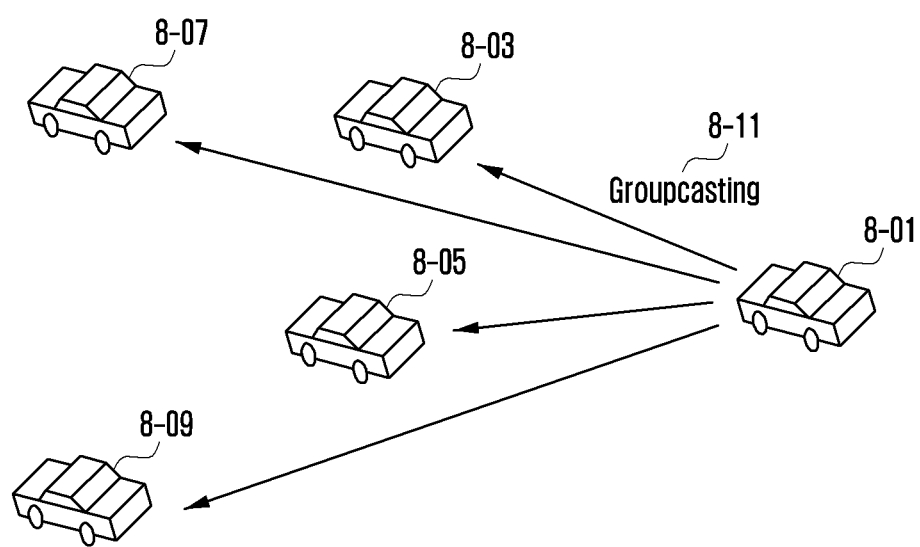
FIG. 8 illustrates an example of groupcasting in which a single terminal transmits common data to multiple terminals according to an embodiment of the disclosure.

FIG. 8 illustrates an example of groupcasting 8-11 in which a single terminal 8-01 transmits common data to multiple terminals 8-03, 8-05, 8-07, and 8-09 according to an embodiment of the disclosure. The terminal 8-01 may be mobile terminals such as vehicles. For the groupcasting 8-11, separate control information, physical control channel, and data may be transmitted.

Figure 9:
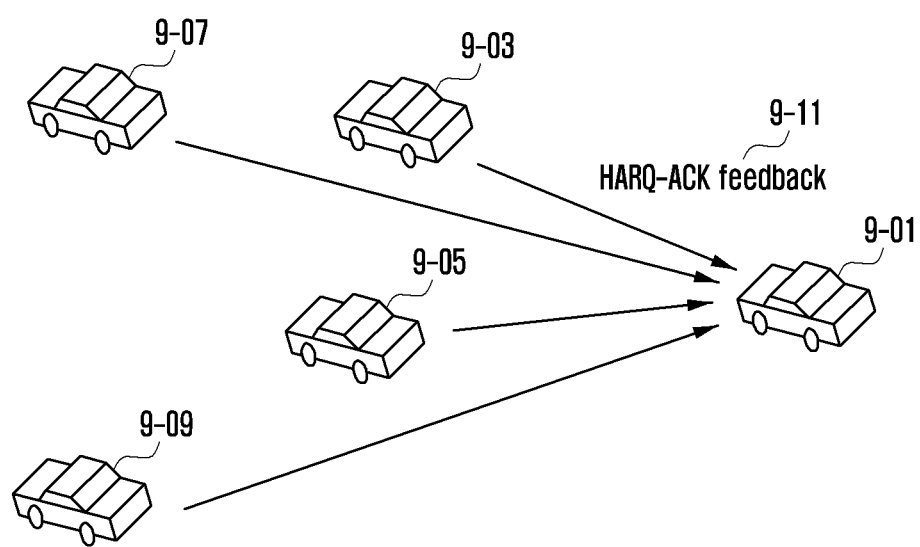
FIG. 9 illustrates a process of transmitting information indicating success or failure of data reception to a terminal having transmitted data, by terminals having received common data via groupcasting according to an embodiment of the disclosure.

FIG. 9 illustrates a process of transmitting information indicating success or failure of data reception to a terminal 9-01 having transmitted data, by terminals 9-03, 9-05, 9-07, and 9-09 having received common data via groupcasting according to an embodiment of the disclosure. The information may include information such as HARQ-ACK feedback 9-11. In addition, each of the terminals 9-03, 9-05, 9-07, and 9-09 may be a terminal having an LTE-based sidelink or an NR-based sidelink function. When the terminal has the LTE-based sidelink function only, an NR-based sidelink signal and physical channel transmission and reception is not possible. In an embodiment of the disclosure, the term "sidelink" may be interchangeably used with "PC5", "V2X", or "device-to-device (D2D)". Even though the groupcasting is described above, the above description may be applied to unicast signal transmission or reception between terminals.

In the embodiment, a terminal may exist in various forms including vehicles or pedestrians.

Figure 10:
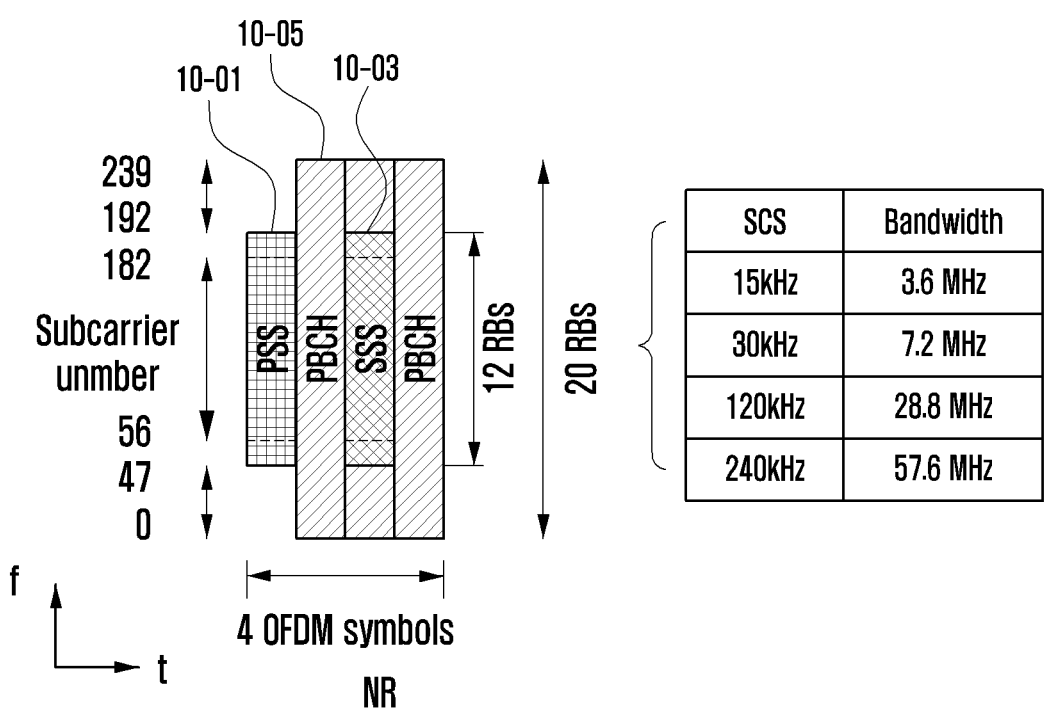
FIG. 10 illustrates mapping of synchronization signals and a physical broadcast channel (PBCH) to a frequency and a time domain in a 3GPP NR system according to an embodiment of the disclosure.

FIG. 10 illustrates mapping of synchronization signals and a physical broadcast channel (PBCH) to a frequency and a time domain in a 3GPP NR system according to an embodiment of the disclosure. A primary synchronization signal (PSS) 10-01, a secondary synchronization signal (SSS) 10-03, and a PBCH are mapped over 4 OFDM symbols, the PSS and the SSS are mapped to 12 RBs, and the PBCH is mapped to 20 RBs. A table in FIG. 10 illustrates frequency bandwidths of 20 RBs, which change according to a subcarrier spacing (SCS). A resource area, in which the PSS, the SSS, and the PBCH are transmitted, may be referred to as a SS/PBCH block (a block).

Figure 11:
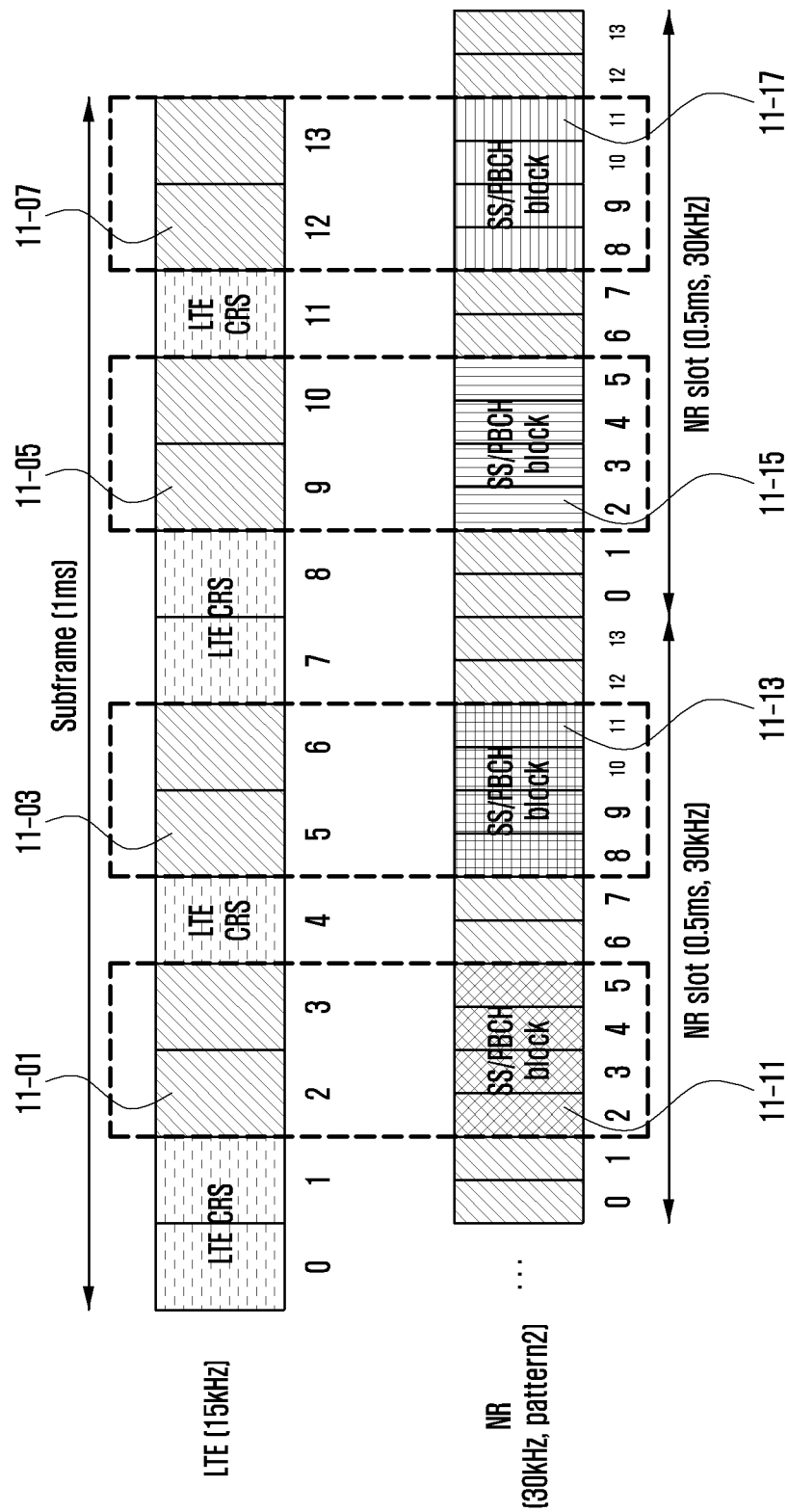
FIG. 11 illustrates symbols in a slot, to which one SS/PBCH block is mapped, according to an embodiment of the disclosure.

FIG. 11 illustrates symbols in a slot, to which one SS/PBCH block described above is mapped. FIG. 11 shows an example of the conventional LTE system employing a 15 kHz subcarrier spacing, and an NR system employing a 30 kHz subcarrier spacing, wherein it is designed that SS/PBCH blocks 11-11, 11-13, 11-15, and 11-17 in the NR system are transmitted at positions 11-01, 11-03, 11-05, and 11-07 in which the SS/PBCH blocks can avoid cell-specific reference signals (CRSs) that are always transmitted in the LTE system. This is for allowing the LTE system and the NR system to coexist in one frequency band.

Figure 12:
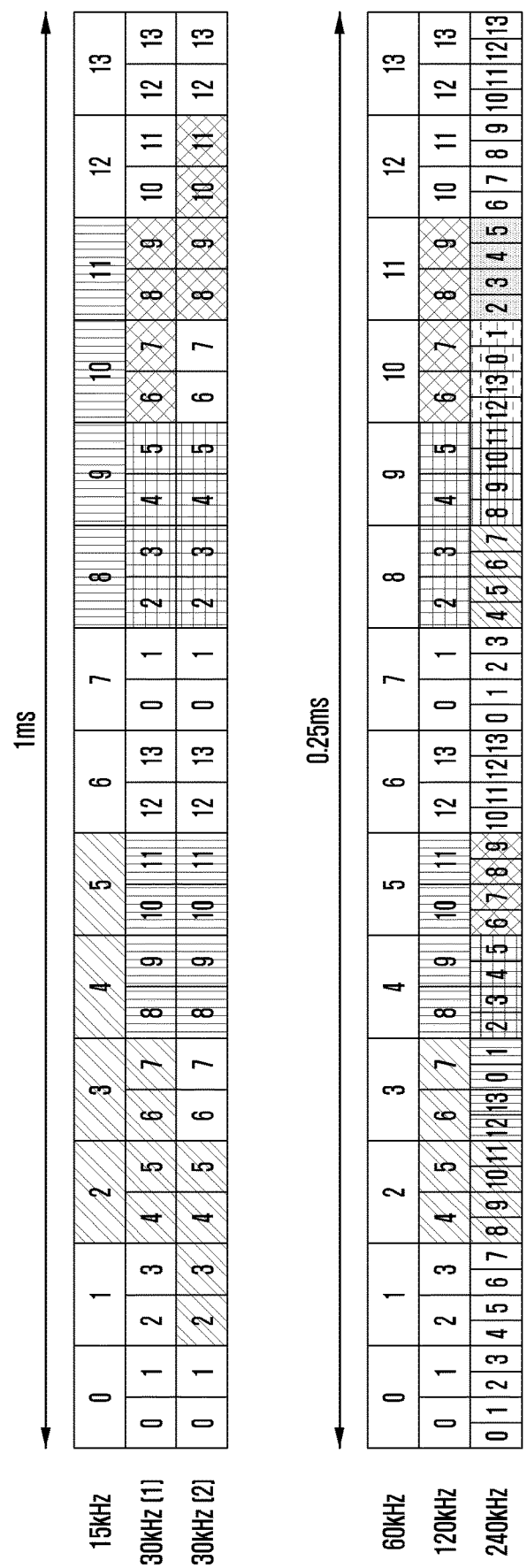
FIG. 12 illustrates symbols within 1 ms, in which an SS/PBCH block is transmittable, displayed according to a subcarrier spacing, according to an embodiment of the disclosure.
Figure 13:
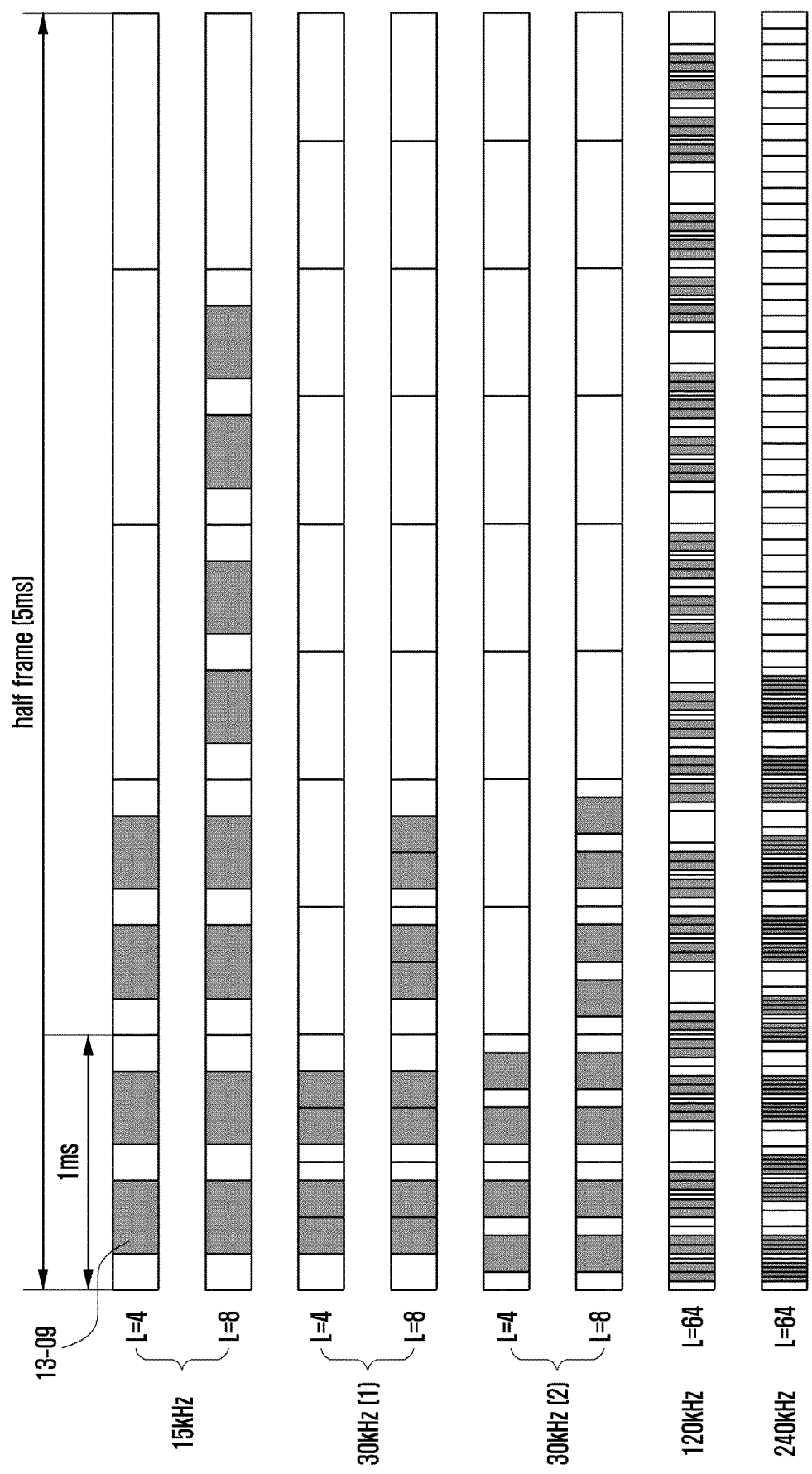
FIG. 13 illustrates a slot and symbols within 5 ms, in which an SS/PBCH block is transmittable, displayed according to a subcarrier spacing, according to an embodiment of the disclosure.

FIG. 12 illustrates symbols within 1 ms, in which an SS/PBCH block is transmittable, displayed according to a subcarrier spacing, and FIG. 13 illustrates a slot and symbols within 5 ms, in which an SS/PBCH block is transmittable, displayed according to a subcarrier spacing. In an area in which the SS/PBCH block is transmittable, the SS/PBCH block is not always to be transmitted, and the SS/PBCH block may or may not be transmitted depending upon the selection of a base station.

In various embodiments of the disclosure, a first signal may be an uplink scheduling acknowledgement signal and a downlink data signal. In addition, in various embodiments of the disclosure, a second signal may be an uplink data signal for uplink scheduling acknowledgement and HARQ ACK/NACK for a downlink data signal. That is, in various embodiments of the disclosure, among signals transmitted from a base station to a terminal, a signal expecting a response from the terminal may be a first signal, and a response signal of the terminal, corresponding to the first signal may be a second signal.

In addition, in various embodiments of the disclosure, a type of service of the first signal belongs to categories of enhanced mobile broadband (eMBB), massive machine-type communications (mMTC), and ultra-reliable and low-latency communications (URLLC). However, these are merely illustrative examples, and the type of service of the first signal is not limited to the described categories in various embodiments of the disclosure.

First Embodiment

Figure 14A:
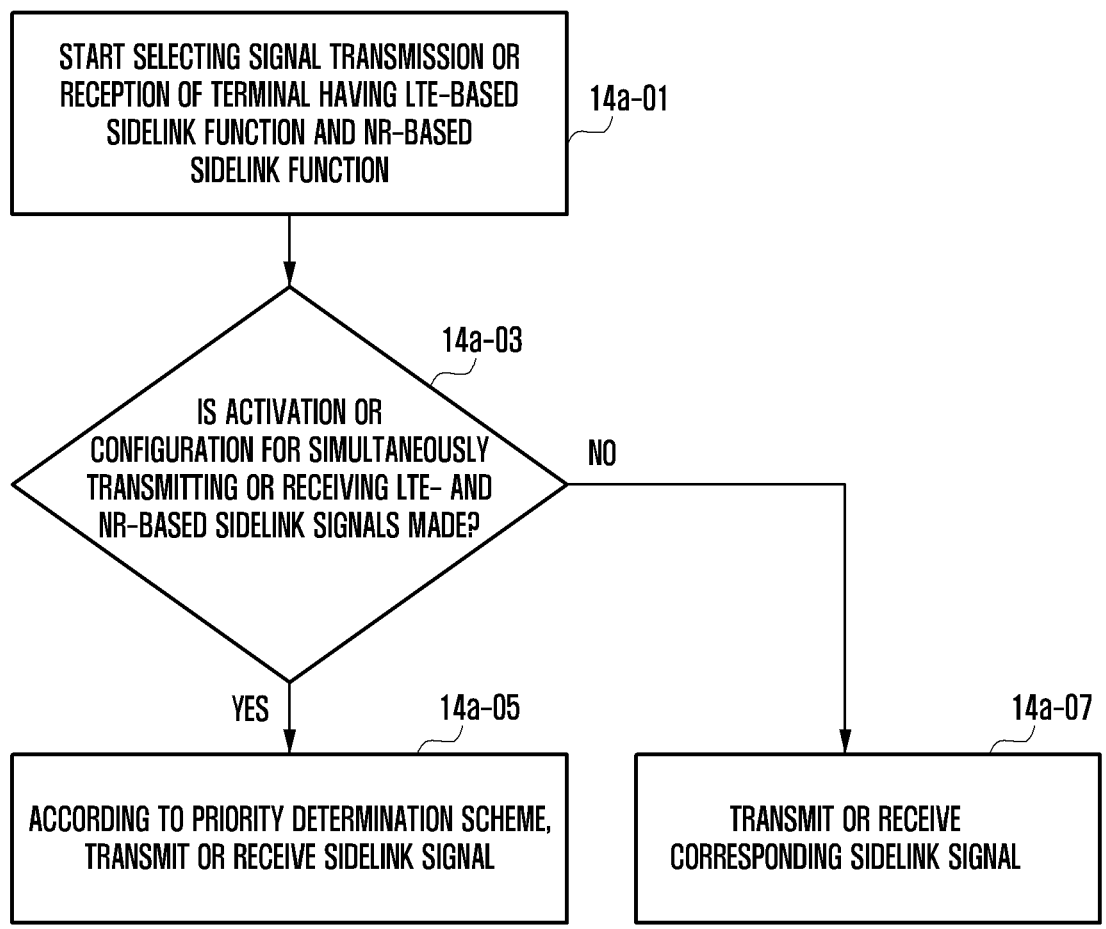
FIG. 14A is a flow chart of determining a sidelink signal to be transmitted or received, by a terminal which has both an LTE-based sidelink signal transmission or reception function and an NR-based sidelink signal transmission or reception function, and for which both functions are activated, according to an embodiment of the disclosure.

A first embodiment illustrates, with reference to FIG. 14A, a method and apparatus for transmitting a signal in a sidelink by activating both an LTE sidelink function and an NR sidelink function when a single terminal supports both functions.

In an embodiment of the disclosure, an NR control channel or control signal in the sidelink is interchangeably used with an NR physical sidelink control channel (NR-PSCCH), and an NR data channel, data signal, or common channel in the sidelink is interchangeably used with an NR physical sidelink shared channel (NR-PSSCH). In addition, an LTE control channel or control signal in the sidelink is interchangeably used with an LTE physical sidelink control channel (LTE-PSCCH), and an LTE data channel, data signal, or common channel in the sidelink is interchangeably used with an LTE physical sidelink shared channel (LTE-PSSCH). In an embodiment of the disclosure, first communication may mean LTE communication, and second communication may mean NR communication.

A single terminal may operate each of LTE V2X and NR V2X in different frequency bands, or in one identical frequency band. To this end, the terminal may be a terminal which accesses an LTE base station and operates, a terminal which accesses an NR base station and operates, or a terminal for transmitting or receiving an LTE V2X- or NR V2X-related signal in the sidelink, without accessing any base station.

FIG. 14A is a flow chart illustrating a scheme of determining a sidelink signal to be transmitted, by a terminal which has both an LTE-based sidelink signal transmission or reception function and an NR-based sidelink signal transmission or reception function, and for which both functions are activated.

In an embodiment of the disclosure, even though the terminal has both the LTE-based sidelink signal transmission or reception function and the NR-based sidelink signal transmission or reception function, when only one function is operated according to activation, the terminal may perform signal transmission or reception of the activated function, without configuring priorities (operation 14a-07). For example, when the terminal having both the LTE-based sidelink signal transmission or reception function and the NR-based sidelink signal transmission or reception function deactivates the NR-based sidelink signal transmission or reception function according to a base station configuration or a configuration predetermined in a particular region, the terminal may perform LTE-based sidelink signal transmission or reception.

In operation 14a-03, the terminal may determine whether simultaneous transmission or reception of LTE- and NR-based sidelink signals is activated. In the above description, when the simultaneous transmission or reception of LTE- and NR-based sidelink signals is activated, it means that a particular time point belongs to a resource pool for an LTE-based sidelink operation, and also belongs to a resource pool for an NR-based sidelink operation. In the disclosure, the simultaneous transmission may mean transmission in the same OFDM symbol or transmission in the same slot. In the above description, the simultaneous transmission may describe the case in which data to be internally transmitted by a terminal is generated, a certain piece of data to be transmitted in an LTE-based sidelink at a particular time point is determined, and another piece of data to be transmitted in an NR-based sidelink at the same particular time point is determined. According the determination, data transmission may be simultaneously performed in the LTE-based sidelink and the NR-based sidelink, but the actual transmission may be performed in either the LTE-based sidelink or the NR-based sidelink. In addition, simultaneous transmission in the above description may describe the case in which it is determined to transmit feedback in the NR-based sidelink at a particular time point, and to transmit data in the LTE-based sidelink at the same particular time point. However, it is not limited thereto, and it may be understood that a transmission operation is performed at the same time point in an absolute time, in consideration of overlapping symbols, etc. In addition, simultaneous reception in the disclosure may mean reception in the same OFDM symbol, or reception in the same slot. However, it is not limited thereto, and it may be understood that a reception operation is performed at the same time point in an absolute time, in consideration of overlapping symbols, etc.

Meanwhile, in FIG. 14A, simultaneous transmission or reception of LTE- and NR-based sidelink signals is described, but an embodiment of the disclosure is not limited thereto. This may be applied the same to transmission of an LTE signal (an LTE sidelink signal, an LTE sidelink synchronization signal, or an LTE discovery signal) and an NR signal (an NR sidelink signal, an NR sidelink synchronization signal, or an NR discovery signal). The determination or the activation and the deactivation in operation 14-03 in FIG. 14A may be performed via higher-layer signaling from a base station, or L1 signaling of DCI transmitted via a medium access control control element (MAC CE) or a physical channel, etc., or may be performed according to a configuration predetermined at a particular region upon a region configuration. For example, when the terminal is connected to the base station, the activation and the deactivation may be determined based on information received from the base station, and when the terminal is not connected to the base station, or the terminal deviates from the coverage of the base station, a predetermined configuration may be applied. In addition, when the connection to the base station is lost, or the terminal deviates from the coverage of the base station, the activation or the deactivation of the simultaneous transmission of the LTE sidelink and the NR sidelink may be determined based on activation and deactivation information which has received in the state in which the terminal was connected to the base station. When both the LTE-based sidelink signal transmission or reception function and the NR-based sidelink signal transmission or reception function are activated or configured for a terminal, the terminal may transmit or receive a sidelink signal according to a priority determination scheme (operation 14a-05). When the LTE-based sidelink signal transmission or reception function and the NR-based sidelink signal transmission or reception function are deactivated or not configured for a terminal, the terminal may perform operation 14a-07.

For example, the priority may be determined by always prioritizing the LTE sidelink function so as to drop transmission or reception of the NR sidelink signal, or to delay or postpone transmission or reception of the NR sidelink signal. This is because the LTE sidelink signal transfers packets having more critical contents in comparison with the contents of the packets of the NR sidelink information. When the terminal is to simultaneously transmit an LTE-PSCCH or an LTE-PSSCH and an NR-PSCCH or an NR PSSCH, the terminal may transmit only the LTE-PSCCH or the LTE-PSSCH, and may not transmit the NR-PSCCH or the NR-PSSCH. Even though both the LTE sidelink operation and the NR sidelink operation are configured and activated for a particular terminal, the terminal does not necessarily transmit the LTE sidelink signal and the NR sidelink signal simultaneously, and may process the signals according to priority when it is scheduled or determined to perform simultaneous transmission in a particular situation. Alternatively, in the above case, the terminal may apply a power allocation scheme of transmitting the LTE-PSCCH or the LTE-PSSCH under the maximum power usable for the transmission, and allocating the remaining transmission power to the NR-PSCCH or the NR-PSSCH.

In another example, the priority between the LTE sidelink signal and the NR sidelink signal may be determined by using the priority of a data packet to be transmitted. A transport block to be prioritized may be transmitted by comparing the priority between a transport block to be transmitted via the LTE-PSSCH and a transport block to be transmitted via the NR-PSSCH. The priority may be a value determined by using the priority delivered from the higher layer, and may be determined based on a value such as ProSe per-packet priority (PPPP) or ProSe per-packet reliability (PPPR). For example, when the priority of the transport block to be transmitted via the LTE-PSSCH is N_LTE, and the priority of the transport block to be transmitted via the NR-PSSCH is N_NR, the terminal may determine to transmit either the LTE-PSSCH or the NR-PSSCH by comparing N_LTE and N_NR. The terminal may prioritize a transport block having a smaller N value. In this case, the sizes of the values of N_LTE and N_NR may be compared to each other under the same condition, or may be compared to each other by adding a predetermined offset value to N_NR. For example, when the offset value is used, N_LTE and N_NR+offset are compared. The offset may be determined according to a base station configuration, but may be a prefixed and predetermined value, or may be a value changed and applied according to an NR-based sidelink configuration or a region. In the case above in which the offset can be configured according to the base station configuration, when the configuration is made by the base station, a configured value may be used as the offset, and when no configuration is made, a predetermined value may be used. The offset configuration is to secure predetermined priority for the LTE signal. The offset value may be received through DCI transmitted via the higher-layer signaling, a medium access control control element (MAC CE), or a physical channel, etc. The terminal may transmit, according to the priority, a transport block having a higher priority first, and may apply a power allocation scheme of transmitting a transport block having a higher priority first under the maximum power usable for transmission, and then allocate the remaining transmission power to a transport block having the next priority.

It is possible to use a combination of the above-described embodiments. Generally, the terminal may identify that the LTE sidelink signal has a higher priority over the NR sidelink signal, may use the priority for each transport block when N_NR and N_LTE of the transport block can be compared, and may determine the priority by comparing the N_NR+offset value and the N_LTE value when an offset value is provided.

In the example above, the case in which a single terminal performs simultaneous transmission of an LTE sidelink signal and an NR sidelink signal is described. In another example, when a synchronization signal (a primary sidelink synchronization signal (PSSS) and a secondary sidelink synchronization signal (SSSS), etc.) or a discovery signal of the LTE sidelink and a synchronization signal, a broadcasting signal, or a discovery signal of the NR sidelink need to be simultaneously transmitted, the terminal may prioritize the signal (the synchronization signal or the discovery signal) of the LTE sidelink over that of the NR sidelink and process the signal of the LTE sidelink. For example, the terminal may transmit the signal (the synchronization signal or the discovery signal) of the LTE sidelink only, and may not transmit the signal of the NR sidelink, or may process the signal of the NR sidelink by delaying the same. Alternatively, as power allows, the terminal may allocate power for transmission to the signal (the synchronization signal or the discovery signal) of the LTE sidelink, and may use the remaining power for NR sidelink signal transmission.

In another example, when a terminal supports communication in an LTE Uu link (a link between a terminal and a base station or a base station-type relay), also supports the LTE sidelink and the NR sidelink, and is to perform simultaneous transmission thereof, for uplink transmission, a scheme of configuring, for the terminal, a priority_threshold_LTE value, which is a reference value compared with a priority value of data to be transmitted in the LTE sidelink to determine whether to perform the uplink transmission, and a priority_threshold_NR value, which is a reference value compared with a priority value of data to be transmitted in the NR sidelink to determine whether to perform the uplink transmission, may be used. In the above description, the priority_threshold_LTE value and the priority_threshold_NR value may be different from each other. For example, in the case in which the terminal simultaneously performs sidelink transmission and uplink transmission to an LTE base station, when the priority of data to be transmitted in the LTE sidelink has a value larger (or smaller) than priority_threshold_LTE, the terminal may perform the LTE sidelink transmission, and in the opposite case, the terminal may perform the LTE uplink transmission. Alternatively, when the priority of data to be transmitted in the LTE sidelink has a value larger (or smaller) than priority_threshold_LTE, the terminal may allocate power for LTE sidelink transmission first, and then allocate the possible remaining power for the LTE uplink transmission. For example, in the case in which the terminal simultaneously performs sidelink transmission and uplink transmission to an LTE base station, when the priority of data to be transmitted in the NR sidelink has a value larger (or smaller) than priority_threshold_LTE, the terminal performs the NR sidelink transmission, and in the opposite case, the terminal may perform the LTE uplink transmission. Alternatively, when the priority of data to be transmitted via the NR sidelink has a value larger (or smaller) than priority_threshold_LTE, the terminal may allocate power for NR sidelink transmission first, and then allocate the possible remaining power for the LTE uplink transmission.

In another example, when a terminal supports communication in an NR Uu link (a link between a terminal and a base station or a base station-type relay), also supports the LTE sidelink and the NR sidelink, and is to perform simultaneous transmission thereof, for uplink transmission, a scheme of configuring, for the terminal, a priority_threshold_LTE value, which is a reference value compared with a priority value of data to be transmitted via the LTE sidelink to determine whether to perform the uplink transmission, and a priority_threshold_NR value, which is a reference value compared with a priority value of data to be transmitted via the NR sidelink to determine whether to perform the uplink transmission, may be used. In the above description, the priority_threshold_LTE value and the priority_threshold_NR value may be different from each other. For example, in the case in which the terminal simultaneously performs sidelink transmission and uplink transmission to an NR base station, when the priority of data to be transmitted via the LTE sidelink has a value larger (or smaller) than priority_threshold_LTE, the terminal may perform the LTE sidelink transmission, and in the opposite case, the terminal may perform the NR uplink transmission. Alternatively, when the priority of data to be transmitted via the LTE sidelink has a value larger (or smaller) than priority_threshold_LTE, the terminal may allocate power for LTE sidelink transmission first, and then allocate the possible remaining power for the NR uplink transmission. For example, in the case in which the terminal simultaneously performs sidelink transmission and uplink transmission to an NR base station, when the priority of data to be transmitted via the NR sidelink has a value larger (or smaller) than priority_threshold_LTE, the terminal performs the NR sidelink transmission, and in the opposite case, the terminal may perform the NR uplink transmission. Alternatively, when the priority of data to be transmitted via the NR sidelink has a value larger (or smaller) than priority_threshold_LTE, the terminal may allocate power for NR sidelink transmission first, and then allocate the possible remaining power for the NR uplink transmission.

(1-1)Th Embodiment

A (1-1)th embodiment provides a method and apparatus for determining LTE and NR sidelink transmission in consideration of a processing time and a processing capability of a terminal, in performing the first embodiment.

When the terminal determines transmission in the LTE or the NR sidelink and prepares actual transmission, a predetermined time is required to cancel transmission which has been already prepared. The predetermined time may be a signal processing time of the terminal. Accordingly, since the time to cancel the transmission which has been already prepared is required, when the LTE sidelink transmission is cancelled according to the NR sidelink transmission, a time required to perform the transmission cancellation is to be considered. In addition, in the opposite case, when the NR sidelink transmission is cancelled according to the LTE sidelink transmission, a time required to perform the transmission cancellation is to be considered.

In an example, when determining and preparing to perform LTE sidelink transmission in slot n, the terminal may determine, in slot n−1, to also perform NR sidelink transmission in slot n. Accordingly, when the LTE sidelink transmission in slot n is to be cancelled, the terminal needs to perform the LTE sidelink transmission cancellation within one slot. That is, the LTE sidelink transmission cancellation needs to be determined within a time corresponding to one slot between slot n−1, in which the NR sidelink transmission is determined, and slot n, in which the LTE sidelink transmission is scheduled. The above-described one slot may not be a sufficient time to cancel the transmission. Accordingly, the terminal may prohibit transmitting data to be transmitted in the NR sidelink in slot n when data to be transmitted in the NR sidelink is generated in slot n−1. This is because when it is determined to transmit the data to be transmitted in the NR sidelink, in slot n, the terminal also needs to cancel an LTE sidelink signal or physical channel which has been determined and prepared to be transmitted also in slot n, according to QoS values (or priority) of the LTE and NR sidelink transmission, but may fail to correctly perform the LTE sidelink transmission cancellation due to the lack of time required to cancel the LTE sidelink signal transmission.

Accordingly, a terminal according to an embodiment of the disclosure may determine whether to perform NR sidelink transmission in slot n only before a particular time point (Tp) of slot n when LTE sidelink transmission is already determined in slot n before NR sidelink transmission is determined. In addition, when the LTE sidelink transmission is already determined in slot n, and a start time of slot n is Tn, during Tn to Tp, no determination on whether to transmit the NR sidelink is allowed in slot n and no determination on performing new transmission is allowed in slot n.

For example, according to the scheme described above, in operation 14a-03, the terminal may determine whether simultaneous transmission of the NR sidelink and the LTE sidelink in slot n is configured.

Meanwhile, the particular time point (Tp) may be determined according to a processing time or processing capability of the terminal. For example, a processing time or processing capability required to cancel the LTE sidelink transmission which has been already prepared by the terminal may be considered. For example, when a time required to cancel the LTE sidelink transmission which has been prepared by the terminal is a time corresponding three slots, the particular time (Tp) may be at least slot n−3 or a slot preceding slot n−3. Information on the particular time point (Tp) may be indicated by an offset value. For example, when the offset value is configured to be 3, the offset value may indicate a slot preceding three slots from slot n.

The information on the particular time point may be determined based on terminal capability information (UE capability information) reported by the terminal. The UE capability information may include information on a time required to cancel the prepared transmission. The base station may configure information on the particular time point, based on the UE capability information reported by the terminal. The information on the particular time point may be already configured for the terminal or the base station. In addition, generally, the terminal and the base station may use a predetermined default value, and when the terminal or the base station reports information on the processing capability, the terminal or the base station may configure information on a new processing time in consideration on the corresponding reported information.

Meanwhile, the operation of reporting the UE capability information and receiving configuration on the particular time point from the base station, by the terminal may be performed before operation 14a-03, but is not limited thereto.

(1-2)Th Embodiment

A (1-2)th embodiment provides a method and apparatus for determining LTE and NR sidelink transmission in the case of transmitting a feedback signal or a feedback channel in the NR sidelink, in performing the first embodiment.

Figure 14B:
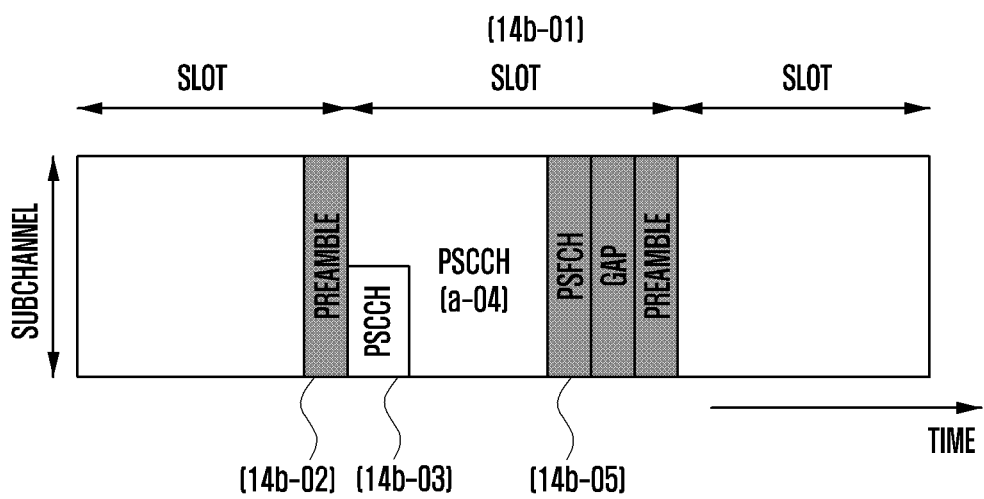
FIG. 14B illustrates a structure of a slot including a PSFCH according to an embodiment of the disclosure.
Figure 14C:
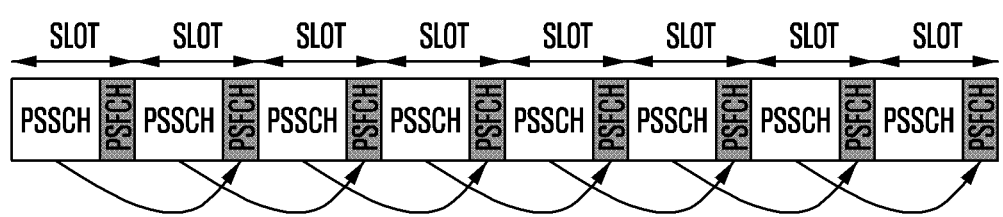
FIG. 14C illustrates a structure of a slot including a PSFCH according to an embodiment of the disclosure.

With regard to the signal transmission or reception in a sidelink in the NR system, a channel for feedback transmission may be defined as a physical sidelink feedback channel (PSFCH). FIG. 14B illustrates an example in which a physical sidelink feedback channel (PSFCH) 14b-05, which is a physical channel for transmitting feedback information, is positioned at the end of a slot 14b-01. By securing a predetermined empty time between a PSSCH 14b-04 and the PSFCH 14b-05, the terminal, which has transmitted or received the PSSCH 14b-04, may prepare transmission or reception of the PSFCH 14b-05. After the transmission or reception of PSFCH 14b-05, a predetermined empty time interval may be secured. FIG. 14C illustrates an example in which a resource capable of transmitting or receiving a PSFCH at each slot is configured.

For example, when configuring the periodicity of a resource capable of transmitting or receiving a PSFCH, by a parameter such as periodicity_PSFCH_resource, FIG. 16B may illustrate the case in which periodicity_PSFCH_resource=1 slot. Alternatively, the periodicity may be configured in units of milliseconds (msec), and a resource for transmitting the PSFCH may be configured for each slot according to a subcarrier spacing (SCS). In FIG. 14C, feedback information relating to the PSSCH scheduled in n slot may be transmitted via the PSFCH in n+1 slot.

Figure 14D:
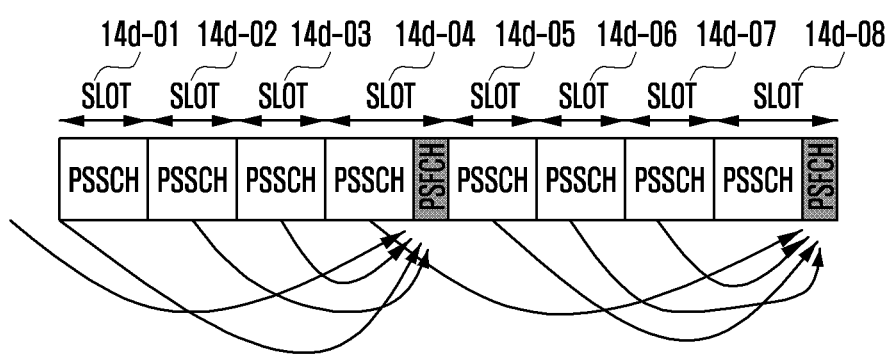
FIG. 14D illustrates a structure of a slot including a PSFCH according to an embodiment of the disclosure.

FIG. 14D illustrates an example in which a resource is configured to transmit or receive a PSFCH in every four slots. FIG. 14D shows an example in which transmission or reception of a PSFCH 14d-11 is configured in the last slot 14d-04 only, among four slots 14d-01, 14d-02, 14d-03, and 14d-04. Similarly, FIG. 14D shows an example in which transmission or reception of a PSFCH 14d-13 is configured in the last slot 14*d*-08 only, among four slots 14*d*-05, 14*d*-06, 14*d*-07, and 14*d*-08. An index of a slot may be an index for slots included in a resource pool. That is, the four slots 14*d*-01, 14*d*-02, 14*d*-03, and 14*d*-04 are not actually physically consecutive slots, but may be consecutively enumerated slots among slots included in a resource pool (or a slot pool) used by the transceiver. In FIG. 14D, an arrow (an arrow from PSSCH to PSFCH) may indicate a PSFCH slot in which HARQ-ACK feedback information of a PSSCH is transmitted. For example, the PSSCH HARQ-ACK information transmitted (or scheduled) in the slots 14*d*-01, 14*d*-02, and 14*d*-03 may be included in a PSFCH 14*d*-11 transmittable in the slot 14*d*-04, so as to be transmitted and received. Similarly, the PSSCH HARQ-ACK information transmitted (or scheduled) in the slots 14*d*-04, 14*d*-05, 14*d*-06, and 14*d*-07 may be included in a PSFCH 14*d*-13 transmittable in the slot 14*d*-08, so as to be transmitted and received. The PSSCH HARQ-ACK feedback information transmitted in slot 14*d*-04 may not be transmitted in a PSFSH of the same slot 14*d*-04, and this may be because of the lack of the time for the terminal to finish decoding of the PSSCH transmitted in the slot 14*d*-04 and transmit the PSFCH in the same slot 14*d*-04. That is, a minimum processing time required to process the PSSCH and prepare the PSFCH is not short enough.

When the terminal transmits or receives a PSFCH, the number of HARQ-ACK feedback bits included in the PSFCH is to be identified in order to correctly perform transmission or reception. The number of HARQ-ACK feedback bits included in the PSFCH, and the PSSCH, the HARQ-ACK bits of which are to be included, may be determined based on one or more of parameters below, or a combination of the one or more parameters.

Periodicity of a slot capable of transmitting or receiving a PSFCH by a parameter such as periodicity_PSFCH_resource Whether HARQ-ACK is bundled. This may be a value acquired by determining, by means of an AND operation, HARQ-ACK bits of a PSFCH transmitted in a predetermined number of slots before PSFCH transmission or reception (i.e., if any one is NACK, it is determined as NACK).

The number of transport blocks (TBs) included in a PSSCH

Whether code block group (CBG)-unit retransmission is used and configured

Whether HARQ-ACK feedback is activated

The number of PSSCHs actually transmitted or received

A minimum processing time (K) required for a terminal to process a PSSCH and prepare PSFCH transmission In the case in which the terminal for receiving a PSSCH receives the PSSCH in slot n, when a resource capable of transmitting the PSFCH is configured or given in slot #n+x, the terminal maps HARQ-ACK feedback information of the PSSCH to the PSFCH in slot n+x and transmits the same by using x which is the smallest among integers equal to or greater than K. Here, K may be a value preconfigured by a transmission terminal, or may be a value configured in a resource pool in which the corresponding PSSCH or PSFCH is transmitted, and, for the configuration above, each terminal may exchange information on its capability with the transmission terminal in advance. The reception terminal may determine the number of HARQ-ACK feedback bits to be included in the PSFCH when the PSFCH is transmitted in a particular slot, in consideration of a slot included in a resource pool, a slot in which a PSFCH resource is configured, periodicity N by which the PSFCH resource is configured, and K configured or determined according to a processing time of the terminal.

When the terminal determines to transmit the PSCCH or the PSSCH in the LTE sidelink and the PSFCH in the NR sidelink in the same slot or at the time point, a scheme of finally determining a signal or a physical channel to be transmitted by the terminal may be provided as follows. For example, when the priority are determined in operation 14-05, the following schemes may be used to apply the priority.

Scheme 1: This is a scheme of transmitting the PSCCH or the PSSCH in the LTE sidelink and prohibiting transmitting the PSFCH in the NR sidelink. Scheme 1 is possible because even though no PSFCH may be transmitted in the NR sidelink, a problem of failing to transmit data in the NR sidelink may not occur.

Scheme 2: This is a scheme of prohibiting transmitting the PSCCH or the PSSCH in the LTE sidelink, and transmitting the PSFCH in the NR sidelink. Scheme 2 is possible because there may be a predetermined time point for transmission in the NR sidelink, so that when no PSFCH is transmitted in the corresponding slot, transmission in the subsequent slot is prohibited, and the PSCCH/PSSCH may be transmitted in the LTE sidelink in a slot after slot n, which is the next slot, such as slot n+1.

Scheme 3: In this scheme, it is assumed that a QoS values (or a priority value) of the PSSCH to be transmitted in the LTE sidelink is a first QoS value, and a QoS value (or a priority value) of the PSSCH of the NR sidelink corresponding to HARQ-ACK included in the PSFCH to be transmitted in the NR sidelink is a second QoS value. The terminal compares the first QoS value and the second QoS value, and transmits the PSCCH or the PSSCH in the LTE sidelink when the first QoS value has a higher priority over the second QoS value. The terminal compares the first QoS value and the second QoS value, and transmits the PSFCH in the NR sidelink when the second QoS value has a higher priority over the first QoS value. In the above description, when a QoS value has a higher priority, it may mean that a priority value thereof is small. Having a higher priority may mean that data having the higher priority needs to be preferentially transmitted first.

Scheme 4: In this scheme, it is assumed that a QoS value (or a priority value) of the PSSCH of the NR sidelink corresponding to HARQ-ACK included in the PSFCH to be transmitted in the NR sidelink is a second QoS value. The terminal compares the second QoS value and a predetermined QoS reference value, and transmits the PSFCH in the NR sidelink when the second QoS value has a higher priority over the QoS reference value. When the QoS reference value has a higher priority over the second QoS value, the terminal prohibits transmitting the PSFCH in the NR sidelink, and may transmit the PSCCH or the PSSCH of the LTE sidelink. In the above description, when a QoS value has a higher priority, it may mean that a priority value thereof is small. Having a higher priority may mean that data having the higher priority needs to be preferentially transmitted first. In the above description, the QoS reference value may be configured according to a resource pool, that is, may have different QoS reference values according to the resource pools, and may be a value configured according to a subcarrier spacing.

Scheme 5: In this scheme, it is assumed that a QoS value (or a priority value) of the PSSCH to be transmitted in the LTE sidelink is a first QoS value. The terminal compares the first QoS value and a predetermined QoS reference value, and transmits the PSCCH or the PSSCH in the LTE sidelink when the first QoS value has a higher priority over the QoS reference value. When the QoS reference value has a higher priority over the first QoS value, the terminal prohibits transmitting the PSCCH or the PSSCH in the LTE sidelink, and transmits the PSFCH of the NR sidelink. In the above description, when a QoS value has a higher priority, it may mean that a priority value thereof is small. Having a higher priority may mean that data having the higher priority needs to be preferentially transmitted first. In the above description, the QoS reference value may be configured according to a resource pool, that is, may have different QoS reference values according to the resource pools, and may be a value configured according to a subcarrier spacing.

(1-3)Th Embodiment

A (1-3)th embodiment provides a method and apparatus for determining LTE and NR sidelink transmission in the case of transmitting physical state report information only, rather than data, in the NR, in performing the first embodiment.

A transmission terminal may transmit a sidelink channel state information reference signal (CRI-RS) in the sidelink, and a reception terminal may receive sidelink CSI-RS and may measure, based on the received sidelink CSI-RS, a channel from the transmission terminal of the sidelink. The sidelink CSI-RS may be transmitted in the same frequency band as that of the PSSCH. The reception terminal may measure a sidelink channel, and then transmit, to the transmission terminal, information (CSI feedback information) on an appropriate modulation order, code rate, layer number (rank), precoding matrix indicator (PMI), etc. The CSI feedback information may be transmitted to the transmission terminal by the reception terminal by means of the PSSCH or the PSFCH. Even when the CSI feedback information is to be transmitted via the PSSCH, the CSI feedback information may be directly mapped to a physical resource, but the feedback information may also be mapped to the MAC CE and then transmitted.

The terminal which transmits the PSCCH and the PSSCH in the sidelink may include at least one piece of the following information in sidelink control information (SCI) and transmit the same to the reception terminal.

Information on whether to transmit the CSI-RS: This is for allowing the reception terminal to receive the CSI-RS and identify channel state information.

Information on whether to report the CSI feedback information: When the CSI information is mapped to a PSSCH resource and transmitted, the reception terminal needs to identify whether the CSI feedback information is mapped to the PSSCH resource so as to successfully decode the PSSCH remaining after excluding the CSI information.

Information on whether a sidelink shared channel (SL-SCH) is included in the PSSCH (indicator indicating whether the SL-SCH is included): This indicates whether the SL-SCH is included in the PSSCH, or only the CSI is separately mapped the PSSCH.

For transmission of the information, a 1 bit of each piece of the information may be included in the SCI. For example, an SL-SCH indicator may be defined by 1 bit as follows. (A value of "1" indicates SL-SCH shall be transmitted on the PSSCH and a value of "0" indicates SL-SCH shall not be transmitted on the PSSCH.)

When the CSI is transmitted via the MAC CE or PC5-RRC, the SL-SCH indicator may not be included in the SCI.

Alternatively, a scheme of indicating two or more pieces of information together by using more bits than 1 bit may be used. For example, each bit may indicate whether at least two pieces of information on whether the CSI-RS is transmitted, information on whether the CSI feedback information is reported, and information on whether the SL-SCH is included in the PSSCH is included, is included by using 2-bit or 3-bit bitmap information.

In the above description, information on whether the SL-SCH is included may be information indicating whether the PSSCH includes only the sidelink CSI feedback information, or also includes other data. When the PSSCH includes only the CSI feedback information and is transmitted, the transmission terminal may no need to transmit, to the reception terminal, information on PSSCH retransmission after the corresponding PSSCH transmission, or initial transmission before the corresponding PSSCH transmission. This is because no data other than the CSI feedback is included in the PSSCH. Accordingly, the SCI for scheduling the PSSCH including only the sidelink CSI feedback may notify the reception terminal of information indicating that at least one of the following bit fields may be fixed to a particular value, and the corresponding PSSCH includes the CSI feedback only.

Resource reservation: A bit field indicating information on a particular frequency-time domain resource to be occupied Frequency resource location of initial transmission and retransmission: A bit field indicating a frequency-domain location of the PSSCH, corresponding to initial transmission or retransmission of the PSSCH to be scheduled Time gap between initial transmission and retransmission: A bit field indicating a time-domain location of the PSSCH, corresponding to initial transmission or retransmission of the PSSCH to be scheduled, that is, a transmission time gap For example, when the PSSCH including only the sidelink CSI feedback is scheduled, the transmission terminal may set, as "0000" (all zero), a time gap between initial transmission and retransmission of the SCI for performing the scheduling, and transmit the same. When the SCI is decoded, and the bit field of the time gap between initial transmission and retransmission has a value of "0000", the reception terminal may understand that the PSSCH scheduled by the SCI includes only the CSI feedback without the SL-SCH. In another example, the bit field of the resource reservation or the frequency resource location of initial transmission and retransmission may be configured to have a particular value, so that it is indicated or interpreted that the PSSCH scheduled by the corresponding SCI includes only the CSI feedback without the SL-SCH.

When the PSSCH to be transmitted in the NR sidelink includes only the CSI information without any other data, the terminal may transmit the LTE PSCCH or the LTE PSSCH, and may prohibit transmitting the NR sidelink PSSCH including the CSI feedback. This is because even though the terminal for receiving the CSI fails to receive the CSI, the missing CSI may not give a large impact on sidelink system operation, in this scheme. For example, in the case in which the priority are determined operation 14a-05, when the PSCCH to be transmitted in the NR sidelink includes only the CSI information without another other data, the terminal may determine that the LTE PSCCH or the LTE PSSCH has a higher priority over the NR sidelink including the CSI feedback.

Second Embodiment

A second embodiment provides a method and apparatus for obtaining a minimum processing time by reflecting whether an LTE sidelink signal or an NR downlink signal to a base station and an NR-PSSCH are simultaneously received or are received in the same slot, in obtaining the minimum processing time for transferring HARQ-ACK feedback on the NR-PSCCH, in the case in which a single terminal supports both an LTE sidelink function and an NR sidelink function, and both functions are activated and used.

When the base station transmits uplink scheduling acknowledgement or downlink control signal and data to the terminal in slot n, the terminal may receive the uplink scheduling acknowledgement or downlink control signal and data in slot n. In this case, the terminal may receive the signal and data a transfer delay time behind the time at which the base station transmitted the signal and data. In the disclosure, when a first signal is received in slot n, the terminal may transmit a corresponding second signal in slot n+k. For example, k may be 4, but is not limited thereto. When the terminal transmits a signal to the base station, in order to allow the signal to arrive at the base station at a particular time, the terminal may transmit HARQ ACK/NACK on uplink data or downlink data at a timing that precedes, by a timing advance (TA), ahead of slot n+4 with reference to a timing at which the terminal received the signal. Accordingly, in the disclosure, a time allowed for the terminal to receive uplink scheduling acknowledgement and transmit uplink data or receive downlink data and prepare for transmitting HARQ ACK or NACK may be a time remaining after excluding a TA from a time corresponding to three slots.

In order to determine the timing, the base station may obtain an absolute value of the TA of the corresponding terminal. When the terminal performs initial access, the base station may obtain the absolute value of the TA by adding or subtracting, to or from a TA value initially transferred to the terminal in a random-access stage, a change in TA values transferred via higher-layer signaling thereafter. In an embodiment of the disclosure, the absolute value of the TA may be a value obtained by subtracting a start time of an $n^{th}$ TTI, in which the terminal performs reception, from a start time of an $n^{th}$ TTI, in which the terminal performs transmission.

In the 5G or NR system, when the base station transmits a PDSCH including downlink data, HARQ-ACK information of the PDSCH may be indicated, via DCI for scheduling the PDSCH, by a K1 value which is a value corresponding to timing information transmitted by the terminal. When the HARQ-ACK information is not indicated to be transmitted prior to symbol L1, including the timing advance, the terminal may transmit the HARQ-ACK information to the base station. That is, at the same or later time point as or from symbol L1, including the timing advance, the HARQ-ACK information may be transmitted from the terminal to the base station. When the HARQ-ACK information is indicated to be transmitted before symbol L1, including the timing advance, the HARQ-ACK information may not be HARQ-ACK information valid for HARQ-ACK transmission from the terminal to the base station. Symbol L1 may be the first symbol at which cyclic prefix (CP) starts after $T_{proc,1}$ from the last time point of the PDSCH. $T_{proc,1}$ may be obtained according to [Equation 1] below.

$$T_{proc,1}=((N_1+d_{1,1}+d_{1,2})(2048+144)\cdot\kappa 2^{-\mu})\cdot T_c \quad \text{Equation 1}$$

In the [Equation 1] above, $N_1$, $d_{1,1}$, $d_{1,2}$, $\kappa$, $\mu$, TC may be defined as follows.

When HARQ-ACK information is transmitted via a PUCCH (an uplink control channel), $d_{1,1}=0$, and when HARQ-ACK information is transmitted via a PUSCH (an uplink shared channel or data channel), $d_{1,1}=1$.

When the terminal receives configuration of multiple activated configured carriers or carriers, the maximum timing difference between carriers may be reflected in second signal transmission.

In the case of PDSCH mapping type A, that is, in the case in which the first DMRS symbol location is the third or fourth symbol of a slot, when location index i of the last symbol of the PDSCH is smaller than 7, $d_{1,2}=7-i$.

In the case of PDSCH mapping type B, that is, in the case in which the first DMRS symbol location is the first symbol of a PDSCH, when the length of the PDSCH corresponds to the length of four symbols, $d_{1,2}=3$, and when the length of the PDSCH corresponds to the length of two symbols, $d_{1,2}=3+d$, and d indicates the number of symbols in which the PDSCH and the PDCCH including a control signal for scheduling the corresponding PDSCH overlap.

$N_1$ is defined according to $\mu$ as shown in [Table 2] below. When $\mu=0, 1, 2, 3$, the values of $\mu$ indicate 15 kHz, 30 kHz, 60 kHz, and 120 kHz subcarrier spacing, respectively.

TABLE 2

| | PDSCH decoding time $N_1$ [symbols] | |
|---|---|---|
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

For the $N_1$ value in [Table 2] above, different values may be used according to UE capability.

Each $N_1$ value is defined by $T_c=1/(\Delta f_{max}\cdot N_f)$, $\Delta f_{max}=480\cdot 10^3$ Hz, $N_f=4096$, $\kappa=T_s/T_c=64$, $T_s=1/(\Delta f_{ref}\cdot N_{f,ref})$, $\Delta f_{ref}=15\cdot 10^3$ Hz, $N_{f,ref}=2048$.

When the terminal simultaneously receives an LTE sidelink signal or an LTE/NR downlink signal from the base station together with an NR-PSSCH, the terminal may process the LTE sidelink or the LTE/NR downlink signal from the base station earlier than the NR-PSSCH. In this case, the terminal may increase a time required to transmit HARQ-ACK feedback on the NR-PSSCH, or to transmit CSI feedback. Accordingly, in the above case, the terminal may obtain the minimum processing time $T_{proc,1}$ for transmission of HARQ-ACK feedback on the NR-PSSCH according to Equation 2 below.

$$T_{proc,1}=((N_1+d_{1,1}+d_{1,2}+d_{1,3})(2048+144)\cdot\kappa 2^{-\mu})\cdot T_c \quad \text{Equation 2}$$

In Equation 2 above, $N_1$, $d_{1,1}$, $d_{1,2}$, $\kappa$, $\mu$, TC may be defined the same as in [Equation 1], and $d_{1,3}$ may be defined as follows.

When the LTE sidelink signal, the LTE downlink signal from the base station, or the NR downlink signal from the base station and the NR-PSSCH are received in the same slot, or in the same OFDM symbol, $d_{1,3}=1$, and $d_{1,3}=0$.

The example above is a scheme of increasing the minimum processing time by one symbol when the NR-PSSCH is simultaneously received with at least one of the LTE sidelink signal, the LTE downlink signal from the base station, or the NR downlink signal from the base station. In the disclosure, the increment in the minimum processing time is not limited to one symbol. The terminal may increase the minimum processing time by n symbols. In addition, the terminal may also increase the minimum processing time by a timing value that is a unit smaller than one symbol. In the disclosure, when the signals are simultaneously received, it may correspond to the case in which the signals are received in the same OFDM symbol, or may be the case in which the signals are received in the same slot. In another example, in obtaining the minimum processing time, the number of simultaneously received signals among three signals of the LTE sidelink signal, the LTE downlink signal from the base station, and the NR downlink signal from the base station may be considered for a value of $d_{1,3}$. Meanwhile, when the NR sidelink signal and the LTE sidelink signal, the LTE downlink signal, or the NR downlink signal are simultaneously received, the terminal may receive, from the base station, an offset value to apply for increasing the minimum processing time, or may use a predetermined value.

When the terminal receives the NR-PSSCH, the terminal may identify whether the LTE sidelink signal, the LTE downlink signal from the base station, or the NR downlink signal from the base station is simultaneously received with the NR-PSSCH. When the terminal is not configured to simultaneously receive the LTE- and NR-based sidelink signals, the operation of identifying whether the LTE sidelink signal is simultaneously received with the NR-PSSCH may be omitted. On the other hand, when the terminal is configured to simultaneously receive the LTE- and NR-based sidelink signal, the terminal may determine whether the NR sidelink signal and the LTE sidelink signal are simultaneously received. Determining whether simultaneous reception is performed may correspond to the case in which the NR sidelink signal and the LTE sidelink signal or the LTE downlink signal from the base station, or the NR downlink signal from the base station are received in the same symbol or the same slot.

When it is determined that the simultaneous reception is performed, the terminal may obtain the minimum processing time required to process HARQ of the NR sidelink signal in consideration of processing of the LTE signal or the NR downlink signal from the base station. The terminal may obtain the minimum processing time by using a parameter mentioned in [Equation 2] above. The terminal may perform the HARQ operation for the reception of the NR sidelink signal by using the obtained minimum processing time.

Third Embodiment

Figure 15:
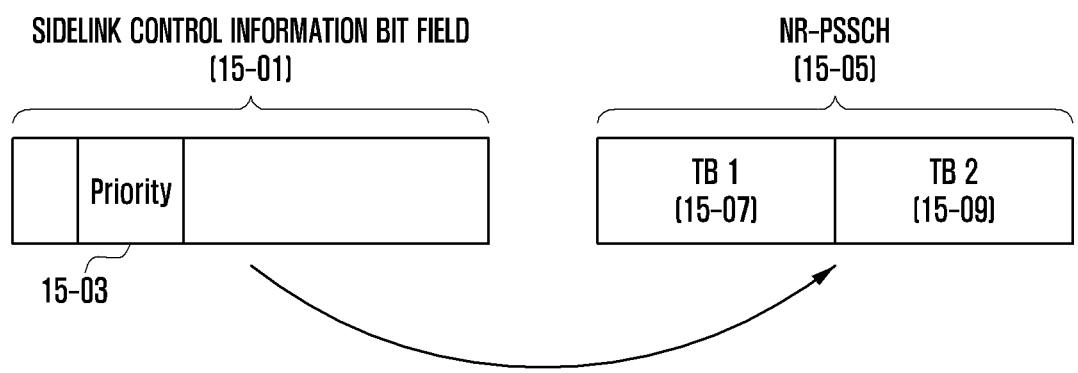
FIG. 15 illustrates an example in which sidelink control information (SCI) transmitted in an NR physical sidelink control channel (NR-PSCCH), which is a control channel, schedules the NR-PSSCH, according to an embodiment of the disclosure.

A third embodiment describes, with reference to FIG. 15, a method of configuring a priority included in sidelink control information (SCI) of an NR-PSCCH when a terminal supports an NR sidelink function, and the corresponding terminal is to transmit two TBs via the NR-PSSCH.

FIG. 15 illustrates an example in which SCI transmitted in an NR-PSCCH, which is a control channel, schedules the NR-PSSCH. The SCI 15-01 may include a priority 15-03 and may be transferred to a reception terminal. The reception terminal may determine whether to perform reception or a signal processing sequence, based on the priority. The priority may relate to data transferred in the higher layer, and may be determined based on a value such as ProSe per-packet priority (PPPP) or ProSe per-packet reliability (PPPR). When the SCI 15-01 schedules the NR-PSSCH 15-05, the NR-PSCCH 15-05 may include two TBs. Each of TB 1 15-07 and TB 2 15-09 may include one or more packets transferred via the higher layer, and each of the packets may have a priority value. Accordingly, a priority value to be used as the priority 15-03 included in the SCI 15-01 for scheduling the NR-PSSCH, among the priority values of the packets included in the two TBs is to be determined. For example, when the NR-PSCCH and the NR-PSSCH are determined by the scheduling of the base station via DCI, the terminal may configure, as the priority included in the SCI, the highest value among the priority values included in two TBs scheduled by the DCI. (For two TB transmission case, the UE shall set the "Priority" field according to the highest priority among those priority(s) indicated by higher layers corresponding to the transport blocks scheduled by the same DCI.) That is, the terminal may configure, as the priority included in the SCI, a value having the highest priority, among the priority values included in multiple packets included in different TBs scheduled via the DCI. It may be determined that the smaller the priority value, the higher the priority. Furthermore, according to the configuration, it may be also determined that the larger the priority value, the higher the priority. In another example, when it is determined that the NR-PSCCH and the NR-PSSCH are transmitted by the terminal, the terminal configures, as the priority included in the SCI, the highest value among the priority value included in two TBs to be transmitted. (For two TB transmission case, the UE shall set the "Priority" field according to the highest priority among those priority(s) indicated by higher layers corresponding to the transport blocks.) That is, the terminal may configure, as the priority included in the SCI, a value having the highest priority, among the priority values included in multiple packets included different TBs to be scheduled via the SCI. It may be determined that the smaller the priority value, the higher the priority. Furthermore, according to the configuration, it may be also determined that the larger the priority value, the higher the priority. Alternatively, when the terminal receives scheduling from the base station and performs sidelink transmission, the terminal may use a priority value transferred via DCI receiving downlink scheduling for the SCI.

Furthermore, the terminal may include the priority value of each TB in the SCI when two TBs are scheduled via one piece of SCI. In addition, when the SCI includes a priority value for each TB, the SCI may be configured to include the priority value for TB 1, and include an offset value on the priority value for TB 2.

Fourth Embodiment

A fourth embodiment provides a method and apparatus using quality of service (QoS) parameter information of data transmitted or received in the operation of performing transmission or reception in the sidelink by the terminal. A QoS parameter may refer to information including requirements to be satisfied by the data, and the requirements may include a delay time (latency or delay), a priority, and the like.

First, the terminal may receive a configuration of a bandwidth part (BWP) for sidelink communication, in a carrier that is being used for transmission and reception for the sidelink communication. The corresponding terminal may process a transmission and a reception signal, based on the BWP.

Next, the terminal may receive a configuration of a resource pool in the configured BWP. The resource pool may be a resource pool for sidelink transmission, may be a resource pool for sidelink reception, or may be a resource pool for both sidelink transmission and reception. In this case, in order to receive resource pool configuration, n_PRBstartRP, which is the lowest PRB index of the corresponding resource pool, may be transferred, and the lowest PRB index of the resource pool may be transferred by using an offset value with reference to the lowest PRB in the BWP where the corresponding resource pool belongs to. That is, n_PRBstartRP, which is the lowest PRB index of the resource pool, may mean the n_PRBstartRP$^{th}$ PRB from the lowest PRB in the corresponding BWP. In this scheme, a reference point in allocating a frequency resource of the resource pool may be the lowest PRB number in the corresponding BWP.

A resource of a resource pool may be determined according to frequency and time resource information, and the configuration relating to the transmission or reception operation performed in the resource pool may be provided to the terminal according to the resource pool. The resource pool resource and configuration information according to the resource pool may be configured for the terminal by the base station, may be configured via information exchange between terminals, or may be prestored in the terminal at the time when the terminal is generated.

In the 5G system, QoS information may be transferred via a QoS parameter, referred to as a "5G QoS identifier (5GI)". A resource type, a priority, a delay time, an error rate, and the like are allocated to one 5QI value, and may be defined as shown in the table below.

TABLE 3

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming V2X messages Electricity distribution - medium voltage, Process automation-monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mssion-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 71 | | 56 | 150 ms (NOTE 11, NOTE 15) | $10^{-6}$ | N/A | 2000 ms | "Live" Uplink Streaming (e.g. TS 26.238 [76]) |
| 72 | | 56 | 300 ms (NOTE 11, NOTE 15) | $10^{-4}$ | N/A | 2000 ms | "Live" Uplink Streaming (e.g. TS 26.238 [76]) |
| 73 | | 56 | 300 ms (NOTE 11, NOTE 15) | $10^{-8}$ | N/A | 2000 ms | "Live" Uplink Streaming (e.g. TS 26.238 [76]) |
| 74 | | 56 | 500 ms (NOTE 11, NOTE 15) | $10^{-8}$ | N/A | 2000 ms | "Live" Uplink Streaming (e.g. TS 26.238 [76]) |
| 75 | | 56 | 500 ms (NOTE 11, NOTE 15) | $10^{-4}$ | N/A | 2000 ms | "Live" Uplink Streaming (e.g. TS 26.238 [76]) |
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing progressive |

TABLE 3-continued

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 9 | | 90 | | | | | video, etc.) |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | DiscreteAutomation(see TS 22.261 [2]) |
| 83 | | 22 | 10 ms (NOTE 4) | $10^{-4}$ | 1354 bytes (NOTE 3) | 2000 ms | DiscreteAutomation(see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 5) | $10^{-5}$ | 255 bytes | 2000 ms | Electricity Distribution- high voltage (see TS 22.261 [2]) |

(NOTE 1):
A packet which is delayed more than PDB is not counted as lost, thus not included in the PER.
(NOTE 2):
It is required that default MDBV is supported by a PLMN supporting the related 5QIs.
(NOTE 3):
This MDBV value is setto 1354 bytes to avoid IP fragmentation for the IPv6 based. IPSec protected GTP tunnel to the 5G-AN node (the value is calculated as in Annex C of TS 23.060 [56] and further reduced by 4 bytes to allow for the usage of a GTP-U extension header).
(NOTE 4):
A delay of 1 ms for the delay between a UPF terminating N6 and a 5G-AN should be subtracted from a given PDB to derive the packet delay budget that applies to the radio interface. When a dynamic CN component of the PDB is used, see clause 5.7.3.4.
(NOTE 5):
A delay of 2 ms for the delay between a UPF terminating N6 and a 5G-AN should be subtracted from a given PDB to derive the packet delay budget that applies to the radio interface. When a dynamic CN component of the PDB is used, see clause 5.7.3.4.
(NOTE 6):
A delay of 5 ms for the delay between a UPF terminating N6 and a 5G-AN should be subtracted from a given PDB to derive the packet delay budget that applies to the radio interface. When a dynamic CN component of the PDB is used, see clause 5.7.3.4.
(NOTE 7):
For Mission Critical services, it may be assumed that the UPF terminating N6 is located "close" to the 5G_AN (roughly 10 ms) and is not normally used in a long distance, home routed roaming situation. Hence delay of 10 ms for the delay between a UPF terminating N6 and a 5G_AN should be subtracted from this PDB to derive the packet delay budget that applies to the radio interface.
(NOTE 8):
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
(NOTE 9):
It is expected that 5QI-65 and 5QI-69 are used together to provide Mission Critical Push to Talk service (e.g., 5QI-5 is not used for signalling). It is expected that the amount of traffic per UE will be similar or less compared to the IMS signalling.
(NOTE 10):
In both RRC Idle and RRC Connected mode, the PDB requirement for these 5QIs can be relaxed for the first packet(s) in a downlink data or signalling burst in order to permit battery saving (DRX) techniques.
(NOTE 11):
In RRC Idle mode, the PDB requirement for these 5QIs can be relaxed for the first packet(s) in a downlink date or signalling burst in order to permit battery saving (DRX) techniques.
(NOTE 12):
This 5QI value can only be assigned upon request from the network side. The UE and any application running on the UE is not allowed to request this 5QI value.
(NOTE 13):
A delay of 20 ms for the delay between a UPF terminating N6 and a 5G-AN should be subtracted from a given PDB to derive the packet delay budget that applies to the radio interface.
(NOTE 14):
This 5QI is not supported as it is only used for transmission of V2X messages over MBMS bearers as defined in TS 23.285 [72].
(NOTE 15):
For "live" uplink streaming (see TS 26.238 [76]), guidelines for PDB values of the different 5QIs correspond to the latency configurations defined in TR 26.939 [77]. In order to support higher latency reliable streaming services (above 500 ms PDB), if different PDB and PER combinations are needed these configurations will have to use non-standardised 5QIs.

For example, in [Table 3] above, a 5QI value, 82 has parameters, wherein a data type is a delay critical GBR, a priority is 19, a delay bound is 10 ms, an error rate is 10', and a maximum data burst volume is 255 bytes.

When the resource pool is configured in the sidelink, a set of 5QI values that data to be transmitted or received in the corresponding resource pool can have may be configured together. That is, when a particular resource pool is configured, it may be configured for the corresponding resource pool that data transmission or reception is performed, wherein the data has 5QI values of 1, 2, 4, 5, 6, 82, 83, and 84, for example. In this case, it may be considered that data having values other than the above-mentioned eight 5QI values {1, 2, 4, 5, 6, 82, 83, and 84} is not transmitted or received in the corresponding resource pool. A sidelink transmission or reception QoS parameter may be determined and applied differently from [Table 3], and the corresponding parameter may be referred to as a "PC5 5QI" or a "PC5 5QI (PQI)". In the above description, PC5 refers to a link between terminals, and may be considered to be a sidelink.

In this case, the terminal for transmitting sidelink control information (SCI) in the corresponding resource pool may include 5QI information in the SCI.

Figure 16:
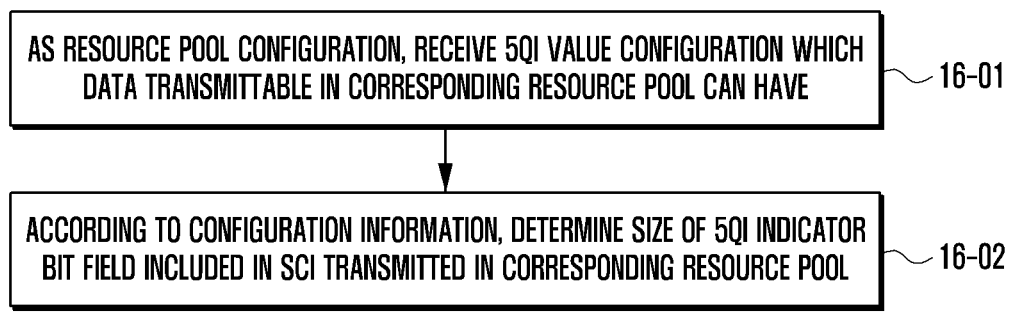
FIG. 16 illustrates an SCI transmission operation of a sidelink transmission terminal according to 5QI configuration information.

FIG. 16 illustrates an SCI transmission operation of a sidelink transmission terminal according to 5QI configuration information. For example, when the corresponding resource pool is configured that data transmission or reception is performed, the data having 5QI values of 1, 2, 4, 5, 6, 82, 83, and 84, three bits of the SCI may be used as a 5QI indicator for indicating one of {1, 2, 4, 5, 6, 82, 83, and 84}. In operation 16-01, the sidelink transmission terminal may receive, as a resources pool configuration, a configuration on a 5QI value that data transmittable in the corresponding resource pool can have. In operation 16-02, the sidelink transmission terminal may determine the size of a 5QI indicator bit field included in SCI transmitted in the corresponding resource pool, according to the configuration information. The sidelink transmission terminal may transmit the SCI including the 5QI configuration information, based on the determined size of the 5QI indicator bit field. A terminal for receiving the SCI may interpret the 5QI indicator bit field included in the SCI, and may identify 5QI information of the data scheduled by the SCI.

Figure 17:
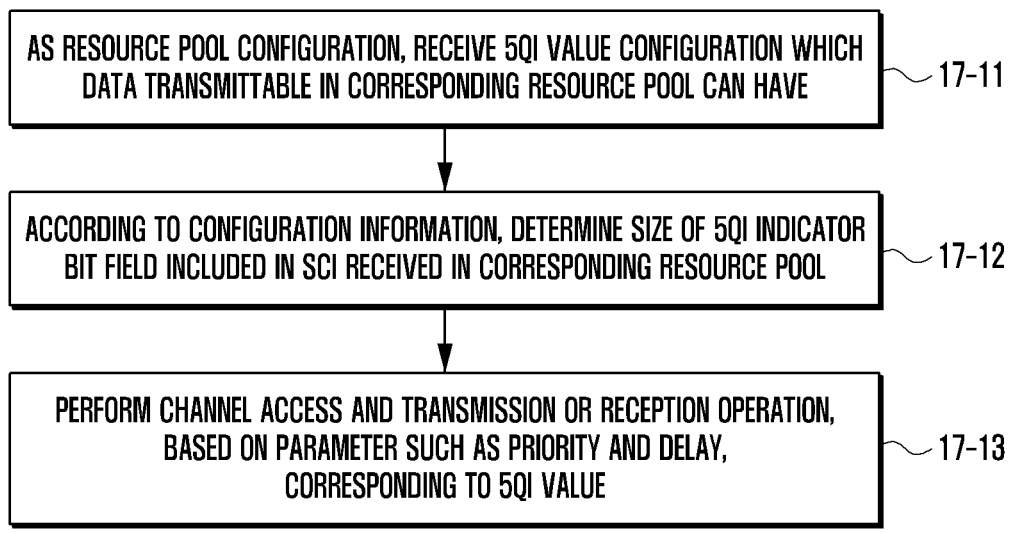
FIG. 17 illustrates an SCI reception operation of a sidelink reception terminal according to 5QI configuration information.

FIG. 17 illustrates a SCI reception operation of a sidelink reception terminal according to 5QI configuration information.

In operation 17-11, the sidelink reception terminal may receive, as a resources pool configuration, a configuration on a 5QI value that data transmittable in the corresponding resource pool can have. In operation 17-12, the reception terminal may determine the size of a 5QI indicator bit field included in SCI received in the corresponding resource pool, according to the configuration information. The sidelink reception terminal may interpret the 5QI indicator bit field included in the SCI, and may identify 5QI information of the data scheduled by the SCI. In operation 17-13, the reception terminal may identify QoS information such as a priority or a delay time of the corresponding data, from the identified 5QI, and may perform channel access, and the like, based on at least one parameter of the QoS information. In the above description, the channel access is used to determine whether the sidelink frequency-time resource may use its own terminal, and may be performed based on SCI decoding, or may be performed by using a scheme of measuring the strength or energy of a received signal, and the like. The size of the 5QI indicator bit field included in the SCI may be determined based on the number of 5QI values configured in the resource pool. That is, when the number of 5QI values of data transmittable in the resource pool is N, the size of the 5QI indicator bit field included in the SCI is ceiling($\log_2(N)$) bits. Here, "ceiling(X)" may mean the smallest integer among integers equal to or greater than X. Accordingly, when there is one 5Q1 value of data transmittable in the corresponding resource pool, that is, when N=1, no 5QI indicator bit field is included in the SCI transmitted in the corresponding resource pool (0 bit). It is described above that information on the 5QI value is configured according to the resource pool, but may be configured according to a BWP. That is, a set of 5QI values that data transmittable or receivable in a particular BWP can have may be configured.

Figure 18:
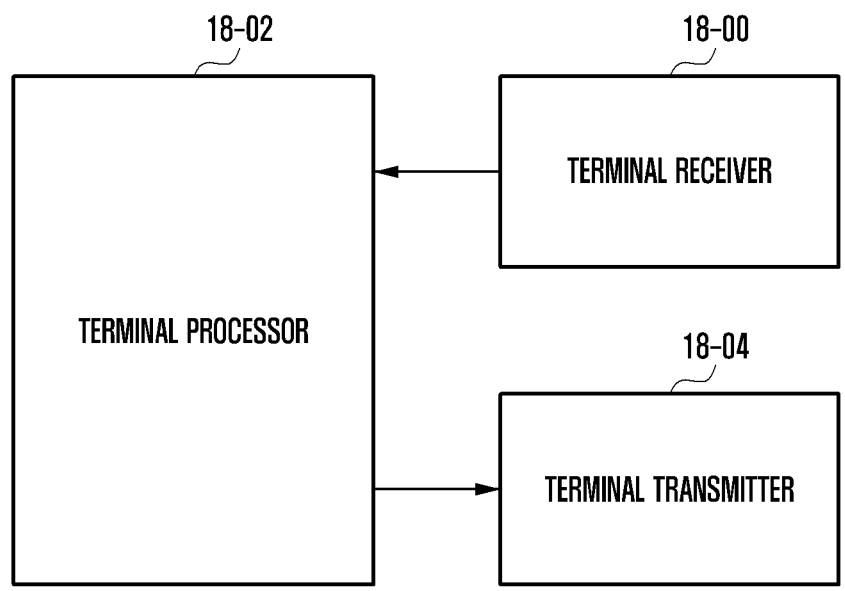
FIG. 18 illustrates a configuration of a terminal according to an embodiment of the disclosure.
Figure 19:
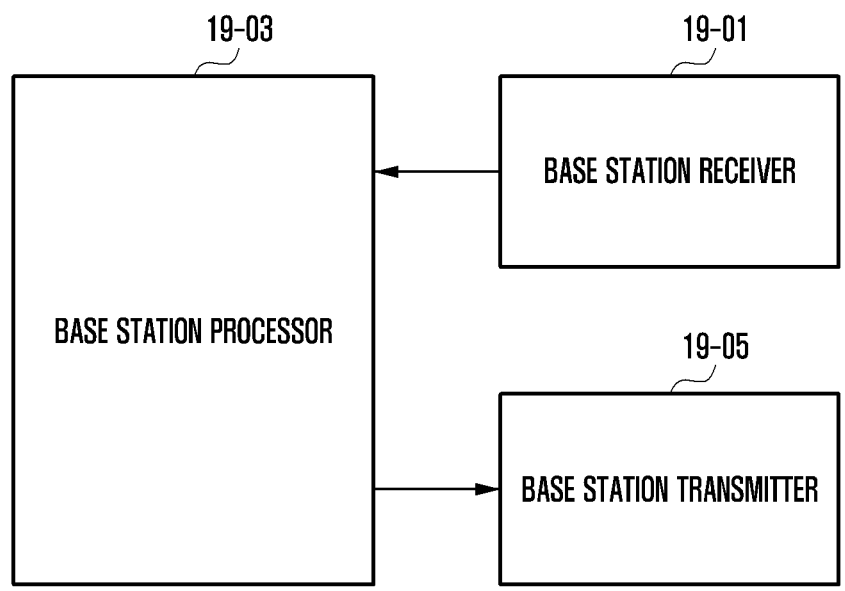
FIG. 19 illustrates a configuration of a base station according to an embodiment of the disclosure.

In order to perform the above-described embodiments, transmitters, receivers, and processors of the terminal and the base stations are illustrated in FIGS. 18 and 19, respectively. In the first embodiment, a method of determining a priority between the LTE sidelink and the NR sidelink, and transmitting and receiving data by the base station and the terminal to perform sidelink signal transmission and receiving operations is described, and to this end, the respective transmitters, receivers, and processors of the base station and the terminal need to operate according to the embodiment. The base station in the following operation may refer to a terminal performing transmission in the sidelink, or may be the conventional base station. The terminal in the following operation may refer to a terminal performing transmission or reception in the sidelink.

Specifically, FIG. 18 illustrates a configuration of a terminal according to an embodiment of the disclosure. As illustrated in FIG. 18, the terminal of the disclosure may include a terminal receiver 18-00, a terminal transmitter 18-04, and a terminal processor 18-02. The terminal receiver 18-00 and the terminal transmitter 18-04 may be collectively referred to as a transceiver in an embodiment of the disclosure. The transceiver may transmit or receive a signal to or from a base station. The signal may include control information and data. To this end, the transceiver may include an RF transmitter that up-converts and amplifies the frequency of a transmitted signal, an RF receiver that low-noise amplifies a received signal and down-converts the frequency thereof, and the like. In addition, the transceiver may output, to the terminal processor 18-02, a signal received via a radio channel, and transmit a signal output from the terminal processor 18-02 via the radio channel. The terminal processor 18-02 may control a series of processes so that the terminal operates according to the above-described embodiments of the disclosure. The terminal processor 18-02 may be referred to as a controller. The controller may include at least one processor.

The processor is connected to the transceiver, and may perform control to: determine to perform simultaneous transmission of a first communication-based sidelink signal and a second communication-based sidelink signal; determine priority of the first communication-based sidelink signal and the second communication-based sidelink signal when the simultaneous transmission is configured; and process, based on the priority, the first communication-based sidelink signal and the second communication-based sidelink signal.

The first communication-based sidelink signal may include a long-term evolution (LTE)-based sidelink signal, and the second communication-based sidelink may include a new radio (NR)-based sidelink signal. In this case, in the priority, the LTE-based sidelink signal may have a higher priority the NR-based sidelink signal.

The controller may determine the priority by using first priority information included in a first packet corresponding to the first communication-based sidelink signal and second priority information included in a second packet corresponding to the second communication-based sidelink signal. Each of the first priority information and the second priority information may correspond to at least one of proximity-based service (ProSe) per-packet priority (PPPP) and ProSe per-packet reliability (PPPR), but are limited thereto.

The controller may determine, based on a processing time of the terminal, to perform the simultaneous transmission. The processing time of the terminal corresponds to a time required to cancel transmission of the first communication-based sidelink signal. In addition, when the NR-based sidelink signal is feedback information of a physical sidelink feedback channel (PSFCH), the controller may transmit no NR-based sidelink signal, or may assign a higher priority to the first communication-based sidelink signal.

Further, when the second communication-based sidelink signal is feedback information of an NR-based PSFCH, the priority may be determined by using a first quality-ofservice (QoS) value of the first communication-based sidelink signal and a second QoS value of the second communication-based sidelink signal.

Furthermore, when the second communication-based sidelink signal is NR-based channel state report information, the controller may transmit no second communication-based sidelink signal is transmitted, or may assign a higher priority to the first communication-based sidelink signal.

FIG. 19 illustrates a configuration of a base station according to an embodiment of the disclosure. As illustrated in FIG. 19, the base station of the disclosure may include a base station receiver 19-01, a base station transmitter 19-05, and a base station processor 19-03. The base station receiver 19-01 and the base station transmitter 19-05 may be collectively referred to as a transceiver in an embodiment of the disclosure. The transceiver may transmit or receive a signal to or from a terminal. The signal may include control information and data. To this end, the transceiver may include an RF transmitter that up-converts and amplifies the frequency of a transmitted signal, an RF receiver that low-noise amplifies a received signal and down-converts the frequency thereof, and the like. In addition, the transceiver may output, to the base station processor 19-03, a signal received via a radio channel, and transmit a signal output from the base station processor 19-03 via the radio channel. The base station processor 19-03 may control a series of processes so that the base station operates according to the above-described embodiments of the disclosure. The base station processor 19-03 may be referred to as a controller. The controller may include at least one processor.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, it is possible to apply embodiment 1 and embodiment 2 in combination. Further, in addition to the above embodiments, other variants based on the technical idea of the embodiments may be implemented in LTE and 5G systems.

The invention claimed is:

1. A method performed by a terminal in a wireless communication system, the method comprising:
identifying a transmission of a first sidelink signal associated with a first radio access technology (RAT) and a transmission of a second sidelink signal associated with a second RAT;
identifying whether the transmission of the first sidelink signal overlaps with the transmission of the second sidelink signal on a time domain; and
transmitting one sidelink signal among the first sidelink signal or the second sidelink signal based on a first priority associated with the first sidelink signal and a second priority associated with the second sidelink signal, in case that the transmission of the first sidelink signal overlaps with the transmission of the second sidelink signal,
wherein, in case that the first sidelink signal corresponds to a first physical sidelink shared channel (PSSCH) using the first RAT, the first priority is obtained based on sidelink control information (SCI) scheduling the first PSSCH, and
wherein, in case that the second sidelink signal corresponds to a synchronization signal using the second RAT, the second priority is indicated by a higher layer of the terminal.

2. The method of claim 1, wherein the one sidelink signal with a highest priority based on the first priority and the second priority is determined.

3. The method of claim 1, wherein, in case that the second sidelink signal corresponds to a physical sidelink feedback channel (PSFCH) using the second RAT, the second priority is obtained based on SCI scheduling a third PSSCH corresponding to the PSFCH.

4. The method of claim 1,
wherein the first priority is determined based on at least one of a proximity service (Prose) per-packet priority (PPPP) or Prose per-packet reliability (PPPR), and
wherein the second priority is determined based on $5^{th}$ generation quality of service identifier (5GQI).

5. The method of claim 1, wherein, in case that the second sidelink signal corresponds to a second PSSCH using the second RAT, the second priority is obtained based on SCI scheduling the second PSSCH.

6. The method of claim 1,
wherein the first priority corresponds to first quality of service (QoS) information associated with the first sidelink signal, and
wherein the second priority corresponds to second QoS information associated with the second sidelink signal.

7. The method of claim 1,
wherein the first RAT corresponds to a long-term evolution (LTE), and
wherein the second RAT corresponds to a new radio (NR).

8. The method of claim 1, wherein the time domain includes at least one symbol or at least one slot.

9. A terminal in a wireless communication system, the terminal comprising:
a transceiver; and
a controller configured to:
identify a transmission of a first sidelink signal associated with a first radio access technology (RAT) and a transmission of a second sidelink signal associated with a second RAT,
identify whether the transmission of the first sidelink signal overlaps with the transmission of the second sidelink signal on a time domain, and
transmit, via the transceiver, one sidelink signal among the first sidelink signal or the second sidelink signal based on a first priority associated with the first sidelink signal and a second priority associated with the second sidelink signal, in case that the transmission of the first sidelink signal overlaps with the transmission of the second sidelink signal,
wherein, in case that the first sidelink signal corresponds to a first physical sidelink shared channel (PSSCH) using the first RAT, the first priority is obtained based on sidelink control information (SCI) scheduling the first PSSCH, and
wherein, in case that the second sidelink signal corresponds to a synchronization signal using the second RAT, the second priority is indicated by a higher layer of the terminal.

10. The terminal of claim 9, wherein the one sidelink signal with a highest priority based on the first priority and the second priority is determined.

11. The terminal of claim 9, wherein, in case that the second sidelink signal corresponds to a physical sidelink feedback channel (PSFCH) using the second RAT, the second priority is obtained based on SCI scheduling a third PSSCH corresponding to the PSFCH.

12. The terminal of claim 9,
wherein the first priority is determined based on at least one of a proximity service (Prose) per-packet priority (PPPP) or Prose per-packet reliability (PPPR), and
wherein the second priority is determined based on $5^{th}$ generation quality of service identifier (5GQI).

13. The terminal of claim 9, wherein, in case that the second sidelink signal corresponds to a second PSSCH using the second RAT, the second priority is obtained based on SCI scheduling the second PSSCH.

14. The terminal of claim 9,
wherein the first priority corresponds to first quality of service (QoS) information associated with the first sidelink signal, and
wherein the second priority corresponds to second QoS information associated with the second sidelink signal.

15. The terminal of claim 9,
wherein the first RAT corresponds to a long-term evolution (LTE), and
wherein the second RAT corresponds to a new radio (NR).

16. The terminal of claim 9, wherein the time domain includes at least one symbol or at least one slot.

* * * * *